(12) United States Patent
Oberheim et al.

(10) Patent No.: US 8,752,461 B2
(45) Date of Patent: Jun. 17, 2014

(54) HINGE CONNECTIONS AND POWER MITER SAW WITH HINGE LINKAGE LINEAR GUIDE INCLUDING SUCH HINGE CONNECTIONS

(75) Inventors: Stephen C. Oberheim, Des Plaines, IL (US); Adam Thomas, Aurora, IL (US); Plamen Marinov, Mount Prospect, IL (US); Jeurgen Wiker, Schaumburg, IL (US)

(73) Assignee: Robert Bosch GmbH, Stuttgart (DE)

( * ) Notice: Subject to any disclaimer, the term of this patent is extended or adjusted under 35 U.S.C. 154(b) by 392 days.

(21) Appl. No.: 13/194,705

(22) Filed: Jul. 29, 2011

(65) Prior Publication Data
US 2012/0006169 A1     Jan. 12, 2012

Related U.S. Application Data

(63) Continuation-in-part of application No. 11/284,931, filed on Nov. 22, 2005, now Pat. No. 8,499,672.

(51) Int. Cl.
*B27B 5/20*     (2006.01)

(52) U.S. Cl.
USPC .......................................... 83/471.3; 16/264

(58) Field of Classification Search
USPC ............. 83/471, 477.2, 483, 485, 490, 471.1, 83/471.3; 16/232, 253, 260, 261, 264
See application file for complete search history.

(56) References Cited

U.S. PATENT DOCUMENTS

| | | | |
|---|---|---|---|
| 1,348,598 A * | 8/1920 | Stretch | 296/92 |
| 1,417,669 A | 5/1922 | Langworthy | |
| 1,620,701 A * | 3/1927 | Teich | 16/339 |
| 1,707,764 A | 4/1929 | Mattison | |
| 1,763,244 A | 6/1930 | Mattison | |
| 1,765,733 A | 6/1930 | Olsen | |
| 2,007,563 A | 7/1935 | Koning | |

(Continued)

FOREIGN PATENT DOCUMENTS

| | | |
|---|---|---|
| AU | 48871/85 | 4/1986 |
| AU | 640250 B2 | 2/1993 |

(Continued)

OTHER PUBLICATIONS

International Search Report and Written Opinion in corresponding PCT application (i.e., PCT/US2012/048634), mailed Nov. 6, 2012 (11 pages).

(Continued)

*Primary Examiner* — Sean Michalski
(74) *Attorney, Agent, or Firm* — Maginot, Moore & Beck

(57) ABSTRACT

A hinge connection between first and second links, including a shaft; a threaded aperture formed within an end portion of the shaft; and a pair of bearings. The hinge connection may optionally include a spacer surrounding the shaft. In addition, there is also a bushing surrounding the end portion of the shaft. A threaded fastening member is inserted into the threaded aperture of the shaft. Upon insertion and tightening of the threaded fastening member, any axial gap between the first bearing and the bushing is eliminated. Also disclosed is a hinge connection with a split shaft, including two cantilever shafts, where a main axial portion of each cantilever shaft is seated within a bore of the first link; and a pair of bearings, where an inner portion of each of the cantilever shafts is rotatably seated within one of the bearings.

17 Claims, 23 Drawing Sheets

(56) References Cited

U.S. PATENT DOCUMENTS

| | | | |
|---|---|---|---|
| 2,167,910 A * | 8/1939 | Rottenburg | 411/386 |
| 2,320,743 A * | 6/1943 | Nilsen et al. | 83/397 |
| 2,389,296 A | 11/1945 | Crane | |
| 2,569,354 A * | 9/1951 | Tracy | 248/662 |
| 2,579,862 A | 12/1951 | Richardson | |
| 2,607,949 A * | 8/1952 | Lyon | 16/340 |
| 2,652,862 A * | 9/1953 | Henry | 83/486.1 |
| 2,664,924 A | 1/1954 | Tracy | |
| 2,708,952 A | 5/1955 | Blackwell | |
| 2,773,524 A * | 12/1956 | Schutz et al. | 83/486.1 |
| 3,063,063 A * | 11/1962 | Brooks | 4/236 |
| 4,011,782 A | 3/1977 | Clark et al. | |
| 4,587,875 A | 5/1986 | Deley | |
| 4,614,140 A | 9/1986 | Macksoud | |
| 4,836,044 A * | 6/1989 | Lobig | 74/579 E |
| 4,862,781 A | 9/1989 | Lauffer | |
| 4,870,882 A * | 10/1989 | Faxon, Sr. | 83/471.3 |
| 4,892,022 A | 1/1990 | Cotton et al. | |
| 4,901,608 A * | 2/1990 | Shieh | 81/177.8 |
| 5,179,886 A * | 1/1993 | Rathje, Jr. | 83/471.3 |
| 5,257,570 A | 11/1993 | Shiotani et al. | |
| 5,265,510 A * | 11/1993 | Hoyer-Ellefsen | 83/471.3 |
| 5,365,812 A | 11/1994 | Harnden | |
| 5,438,899 A * | 8/1995 | Hoyer-Ellefsen | 83/471.3 |
| 5,638,731 A * | 6/1997 | Garuglieri | 83/397 |
| D391,585 S | 3/1998 | Chen | |
| D391,973 S | 3/1998 | Price et al. | |
| 5,791,224 A | 8/1998 | Suzuki | |
| 5,839,339 A | 11/1998 | Sasaki et al. | |
| 5,870,939 A | 2/1999 | Matsubara | |
| 6,035,491 A * | 3/2000 | Hartigan et al. | 16/342 |
| D425,083 S | 5/2000 | Brickner, Jr. et al. | |
| 6,105,809 A * | 8/2000 | Yamanaka | 220/326 |
| 6,120,403 A * | 9/2000 | Suzuki et al. | 474/111 |
| 6,131,557 A * | 10/2000 | Watson | 125/13.01 |
| 6,311,424 B1 * | 11/2001 | Burke | 42/118 |
| D455,445 S | 4/2002 | Bean et al. | |
| D459,373 S | 6/2002 | Hollinger et al. | |
| 6,532,853 B1 | 3/2003 | Kakimoto et al. | |
| 6,591,451 B2 * | 7/2003 | Gruber et al. | 16/262 |
| 6,679,144 B2 * | 1/2004 | Yeo et al. | 82/112 |
| D487,280 S | 3/2004 | Hon et al. | |
| 6,892,618 B2 | 5/2005 | Chin-Chin | |
| 7,059,228 B2 | 6/2006 | Chang | |
| 7,387,056 B2 * | 6/2008 | Higuchi | 83/483 |
| 7,503,246 B2 | 3/2009 | Imamura et al. | |
| D664,572 S | 7/2012 | Zhou et al. | |
| 8,499,672 B2 * | 8/2013 | Oberheim | 83/581 |
| 8,631,734 B2 * | 1/2014 | Liu | 83/471.3 |
| 2002/0066346 A1 | 6/2002 | Gass et al. | |
| 2002/0090255 A1 | 7/2002 | Chien | |
| 2003/0226436 A1 | 12/2003 | Higuchi | |
| 2004/0069109 A1 | 4/2004 | Sprague | |
| 2004/0112190 A1 | 6/2004 | Hollis et al. | |
| 2005/0028660 A1 | 2/2005 | Chin-Chin | |
| 2005/0056128 A1 | 3/2005 | Chang | |
| 2006/0042444 A1 * | 3/2006 | Ushiwata et al. | 83/581 |
| 2007/0137452 A1 | 6/2007 | Oberheim | |
| 2007/0151434 A1 | 7/2007 | Oberheim | |
| 2010/0058909 A1 | 3/2010 | Chen | |
| 2010/0212467 A1 | 8/2010 | Oohama | |
| 2011/0303065 A1 | 12/2011 | Liu et al. | |
| 2012/0017737 A1 * | 1/2012 | Liu et al. | 83/471.3 |

FOREIGN PATENT DOCUMENTS

| | | |
|---|---|---|
| DE | 26 16 608 | 10/1977 |
| DE | 197 10 865 A1 | 9/1998 |
| DE | 20 2008 016 712 U1 | 6/2010 |
| EP | 1 410 886 A2 | 4/2004 |
| EP | 1 787 773 | 5/2007 |
| EP | 2 233 235 A2 | 9/2010 |

OTHER PUBLICATIONS

International Search Report and Written Opinion in corresponding PCT application (i.e., PCT/US2012/048615), mailed Oct. 25, 2012 (8 pages).
International Search Report and Written Opinion in corresponding PCT application (i.e., PCT/US2012/048628), mailed Nov. 9, 2012 (9 pages).
International Search Report and Written Opinion in corresponding PCT application (i.e., PCT/US2012/048624), mailed Oct. 26, 2012 (11 pages).
Machine Translation for DE 202008016712 (6 pages).

* cited by examiner

HINGE CONNECTIONS AND POWER MITER SAW WITH HINGE LINKAGE LINEAR GUIDE INCLUDING SUCH HINGE CONNECTIONS

This patent is a Continuation-in-Part (CIP) application of U.S. application Ser. No. 11/284,931, which was filed on Nov. 22, 2005.

BACKGROUND OF THE INVENTION

This patent generally relates to power miter and abrasive cut off saws, and to hinge connections that may be used in such saws, as well as in other devices, such as in other types of power tools.

Miter saws have been the subject of continued research and development efforts in the power tool arena for decades, and many improvements have been made that has resulted in increased ease of use and productivity. Artisans who install trim carpentry have used power miter saws for some time and it is well known that wide stock such as crown molding and the like often requires a miter saw with either a bigger saw blade or a configuration that enables the blade to be moved along a horizontal path away and toward the fence of the miter saw. Such blade moving configurations are generally marketed as sliding compound miter saws, principally because most if not all commercially available saws of this type have a sliding guide assembly comprised of elongated rods that slide in respective bushings to move the saw blade and motor assembly relative to the fence of the saw.

Such sliding guide assemblies are an expensive component of such miter saws. The current state of the art for such sliding miter saws includes a linear guide that typically consists of two of such bushings and rod combinations. These relatively expensive linear bearings consist of recirculating ball bearings that operate together with turned, ground, polished and hardened steel rods that are approximately 40 cm long and 30 mm in diameter. To have minimum play and deflection of the saw blade and motor assembly, precise fits are required between the rods and the linear recirculating ball bearings over the entire linear travel of the rods. The rod must be made of a high hardness steel to prevent indentation by the hard steel balls. Such construction is relatively expensive.

Additionally, an undesirable feature of such bushing and rod linear guides is that space must be provided behind the saw for the rods to extend when the saw blade is positioned near the fence. Because of this space requirement, such a sliding saw cannot be put next to a wall which results in a larger footprint being occupied by such a saw. Additionally, these bushings and rod linear guide mechanisms are susceptible to damage from dirt and grit, particularly if the saw is a sliding abrasive cut off saw where an abrasive wheel is used to cut steel and other materials. The abrasive wheel grinds its way through the steel and produces a considerable volume of abrasive particles that generally come out of the back of the saw. These abrasive particles can penetrate into the ball bushings and damage the bearing. While it is possible to cover the rods with a bellows or similar cover, the hostile environment generally leads to degradation of the fabric and penetration of the ball bushing by the abrasive particles.

There is a continuing need for improvement in the design and development of miter and cut-off saws that have linear guide assemblies.

SUMMARY OF THE INVENTION

A power miter saw including a saw base having a fence for positioning a work piece, a table rotatably connected to the saw base; a miter arm assembly for angularly positioning the table relative to the saw base, a saw blade and motor assembly operatively connected to the table, a linear guide mechanism attached to the table and being configured to support the saw blade and motor assembly and enable movement of the assembly along a predetermined linear path in either forward or rearward directions, the mechanism having a horizontal shaft about which the assembly is pivotable to move a saw blade vertically into and out of cutting position, the mechanism also having a multiple link hinge pivotally interconnecting the motor assembly and the table with generally horizontal shafts that are parallel to one another.

Also disclosed is a hinge connection between a first link and a second link, where the hinge connection includes: a shaft that is fixed for rotation with respect to the first link, but that is able to rotate with respect to the second link; a threaded aperture formed within a first end portion of the shaft; and a pair of bearings associated with the second link, where the shaft is seated within the bearings. The hinge connection may optionally include a spacer surrounding the shaft, where the spacer is positioned between the bearings. In addition, there is also a bushing surrounding the first end portion of the shaft, where the bushing is positioned such that a first one of the bearings is located between the spacer (if provided) and the bushing A threaded fastening member that is configured and arranged to be inserted into the threaded aperture of the shaft is also provided, as well as a bushing flange that extends radially outwardly from a first end portion of the bushing. At least a portion of the bushing flange is configured and arranged to receive an axial force applied by the threaded fastening member as the threaded fastening member is tightened. Finally, the bushing flange is configured and arranged to be seated within an enlarged bore formed in a first end portion of the first link, whereby upon insertion and tightening of the threaded fastening member such that the threaded fastening member applies the axial force upon the bushing, any axial gap between the first bearing and the bushing is eliminated. Embodiments of miter saws including such a hinge connection are also disclosed.

A hinge connection with a split shaft is also disclosed. Such a hinge connection is made between a first link and a second link, where the first link includes a pair of outer flanges that surround a portion of the second link, and where the hinge connection includes: a pair of cantilever shafts, where a main axial portion of each of the cantilever shafts is seated within a bore formed within each of the outer flanges of the first link; and a pair of bearings associated with the second link, where an inner portion of each of the cantilever shafts is rotatably seated within one of the bearings. Embodiments of miter saws including such a hinge connection are also disclosed.

DETAILED DESCRIPTION

Figure 1:
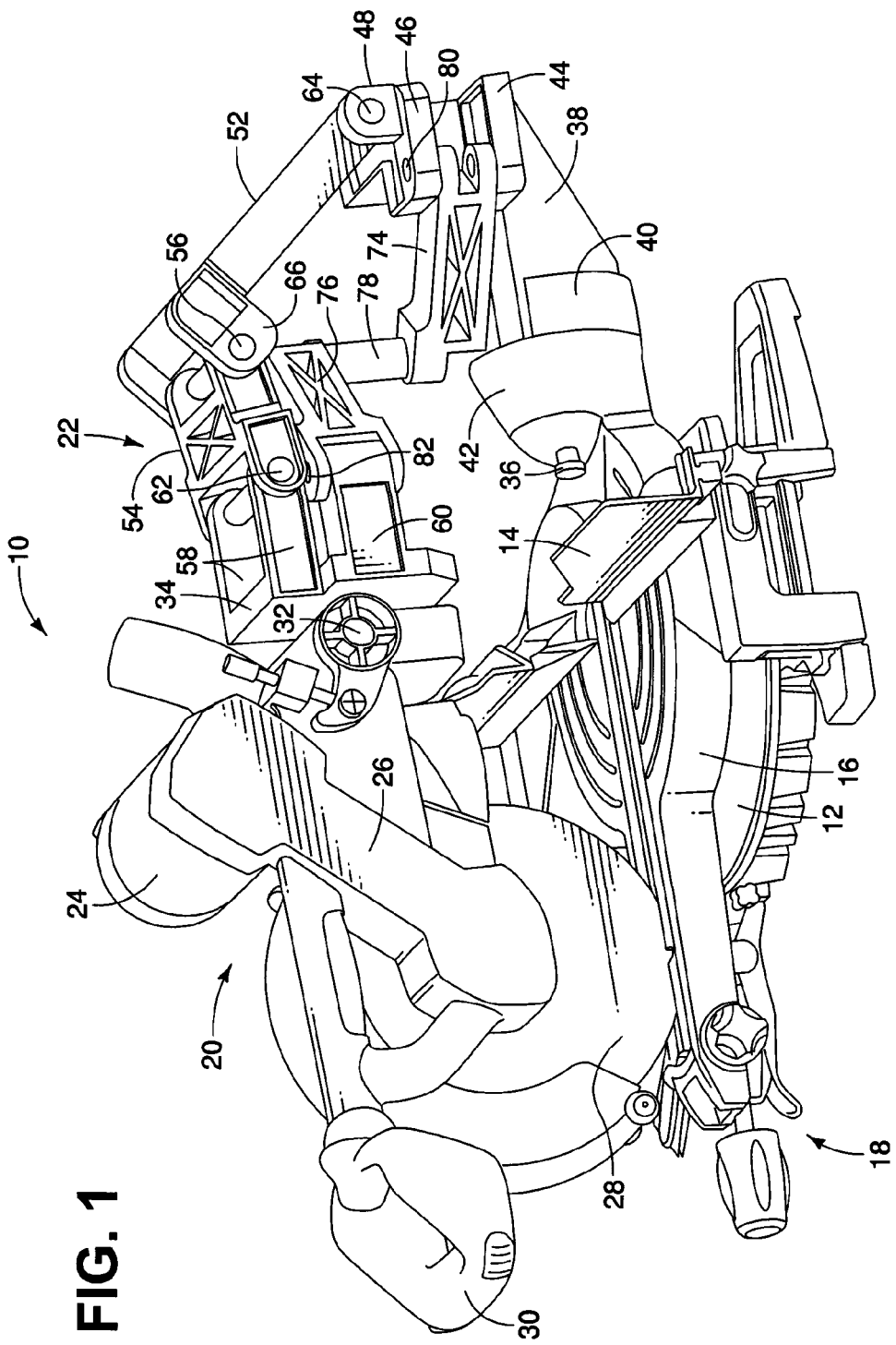
FIG. 1 is a right side perspective view of a first preferred embodiment of the present invention, particularly illustrating the saw blade being located in the extended position away from the fence.

Various different embodiments of the miter saws and hinge connections are shown and described herein, with each of the embodiments of the miter saws having a multiple hinge linkage that is designated herein as a horizontal hinge linkage that interconnects the saw blade and motor assembly to the table of the miter saw. It should be understood that while it is referred to herein as a generally horizontal hinge linkage, the several shafts of the linkage may not always be exactly horizontal, and may have a pivot axis that can vary up to about 30 degrees in either direction from exact horizontal. However, it is preferred that the axes be in a substantially horizontal orientation when the saw is set at a zero degree bevel position. Regardless of the bevel angle or the orientation of the surface on which the saw is supported, the shafts are preferably substantially parallel to the arbor shaft in which the blade is mounted and therefore substantially perpendicular to the plane of the saw blade.

The horizontal hinge linkage is utilized rather than an elongated rod and bushing configuration and provides increased stiffness to undesired movement of the saw blade arising from structural deflections during cutting operations. Some of the embodiments also have a vertical hinge linkage for maintaining the elevation of the saw pivot head (to which the saw blade and motor assembly is attached) constant during movement of the saw blade and motor assembly away and toward the fence during a cutting operation. A third preferred embodiment utilizes the horizontal hinge linkage together with a single rod and bushing arrangement whereby the rod and bushing arrangement also maintains a constant elevation of the saw pivot head as the saw blade and motor assembly is moved toward and away from the fence during a cutting operation. It should be understood that the saw blade and motor assembly is pivotable about a saw pivot that is part of the saw pivot head, which is attached to the horizontal hinge linkage. The saw blade and motor assembly can be pivoted up out of contact with a work piece or moved down into contact with a work piece during a cutting operation as is conventional for miter saws.

Such hinge linkages have a cost advantage compared to conventional bushing and rod guides because they have a simpler construction, which may comprise as few as two generally planar shaped linkages that are connected together by shafts that may preferably incorporate rotary bushings or low cost ball bearings and which are also linked to the support frame of the rotatable table as well as to the saw pivot head. Tight tolerance fits between hinge components are relatively easier to achieve using low cost ball bearings that are preloaded in the axial direction so that nearly all axial and radial play is removed. In contrast, conventional bushings and sliding rod systems require expensive manufacturing processes to ensure that the outside surface of the rod is precise over its entire length. Another advantage of the use of hinge linkages is that their stiffness characteristics are determined primarily from the width of the hinge linkages as measured along the pivot, i.e., shaft axis. Thus, increased system stiffness can be achieved by making the hinge larger and this is generally less expensive than using larger rods and bushings.

As previously mentioned, the horizontal hinge linkage pivots around axes that are perpendicular to the cutting plane of the blade and therefore provides increased stiffness along the axis of rotation of the saw blade and because of this desirable characteristic, the length of the hinge shafts is greater than other shaft lengths such as those used in the vertical hinge linkage. The structural stiffness is very important to the quality of cuts made by the saw. Without the requisite structural stiffness, it is common for the saw blade to deflect out of the desired cutting plane on an intermittent basis which can result in one or more cut discontinuities or jagged cut portions, rather than a continuous smooth cut at the desired angle.

Another advantage of the hinge linkage is that it has greatly reduced sensitivity to dirt and grit because the bearing surfaces of a hinge linkage are not exposed but are contained within a ball bearing or short rotary bushing. Such ball bearing or rotary bushings can be relatively easily sealed compared to a rod and bushing system where the entire rod is a critical bearing surface and therefore has to be sealed with a large accordion or bellow shaped fabric or other type of cover which is often easily damaged.

Turning now to the first preferred embodiment shown in FIGS. 1-4, the miter saw, indicated generally at 10, has a generally circular base 12 with an attached fence 14, which base supports a rotatable table 16 that has a miter arm control assembly, indicated generally at 18, for adjusting the rotational position of the table for setting the miter angle of work piece that would be placed on the table 16. A saw blade and motor assembly, indicated generally at 20, is operatively connected to the table 16 by a linear guide mechanism, indicated generally at 22. The saw blade and motor assembly 20 has an electric motor 24 that is operatively connected through a belt and gear mechanism (not shown but located within housing portion 26 that drives a saw blade 28). A handle 30 enables an operator to move the blade and motor assembly 20 into and out of engagement with a work piece that may be placed on the table 16 adjacent the fence 14. The blade and motor assembly 20 is pivotable about a saw pivot shaft 32 that is connected to a saw pivot head 34 to which the linear guide mechanism 22 is attached. The blade and motor assembly 20 is shown in FIG. 1 to be in a position where the blade is moved to its extended position away from the fence 14 and lowered into cutting position where a workpiece is placed on the table 16. During operation, an operator places a work piece on the table 16, brings the handle 30 down into cutting position either before or after activating the motor 24 and then pushes the handle 30 toward the fence 14 to have the blade 28 cut the work piece. At the end of the cut, the blade and motor assembly 20 would be essentially in the position shown in FIG. 2 where the bottom reach of the blade 28 is generally coextensive with the fence 14.

The linear guide mechanism 22 of the first preferred embodiment shown in FIGS. 1-4 is designed so that the miter saw has a dual bevel operation, rather than a single bevel operation, meaning that the bevel angle can be adjusted either right or left from the normal zero angle or position wherein the plane of the blade 28 is perpendicular to the plane of the top surface of the table 16. The blade and motor assembly 20 as well as the linear guide mechanism and rotate about a bevel pivot shaft 36, with the linear guide mechanism having a support frame 38 with a generally cylindrical end portion 40 to which the bevel pivot shaft 36 is connected to. The shaft 36 extends through an opening in an enlarged extension 42 of the table 16. Thus, the end portion 40 can rotate relative to the extension 42 and be supported by the shaft 36. The support frame 38 is preferably a casting that has a lower flange 44, an upper flange 46 as well as vertically oriented flanges 48 and 50.

A horizontal hinge linkage is comprised of links 52 and 54 which have adjacent ends connected together by a shaft 56. The saw pivot head 34 has a pair of spaced flanges 58 as well as a single flange 60 located below the flanges 58. The link 54 has its opposite end connected to the flanges 58 by a shaft 62. Similarly, the opposite end of the link 52 is connected to the vertical flanges 48 and 50 by a shaft 64. As previously mentioned and while not specifically illustrated, the shafts 32, 62, 56, 64, 78 and 82 are preferably of the type which utilize rotary bushings or low cost ball bearings so that they are freely rotatable and will have an extended useful life. As discussed below while referring to FIGS. 21-25, which show various different hinge connections, any of these different configurations of hinge connections may be used in any of the embodiments of the miter saws in place of the hinge connections shown. Additionally, as each of the miter saws includes a plurality of hinge connections, multiple different types of hinge connections may be used within a single embodiment, as there is no requirement that all hinge connections within a singe device be of the same type. Further, each of the hinge connections within a single device may be of any appropriate size, and thus hinge connections of different sizes may be utilized within a single device.

Figure 2:
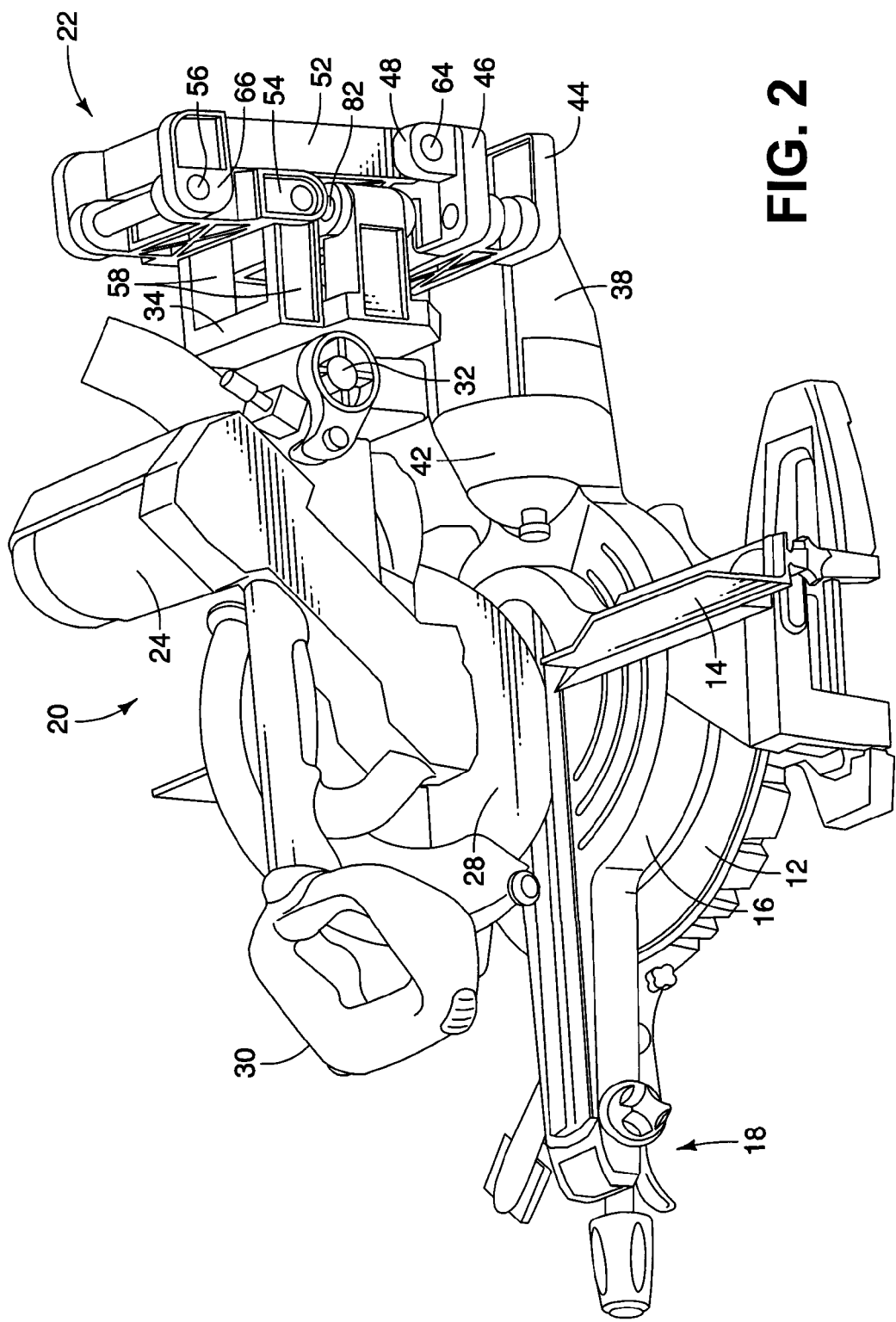
FIG. 2 is a right side perspective view of the embodiment shown in FIG. 1, but illustrating the saw blade in a position near the fence.
Figure 3:
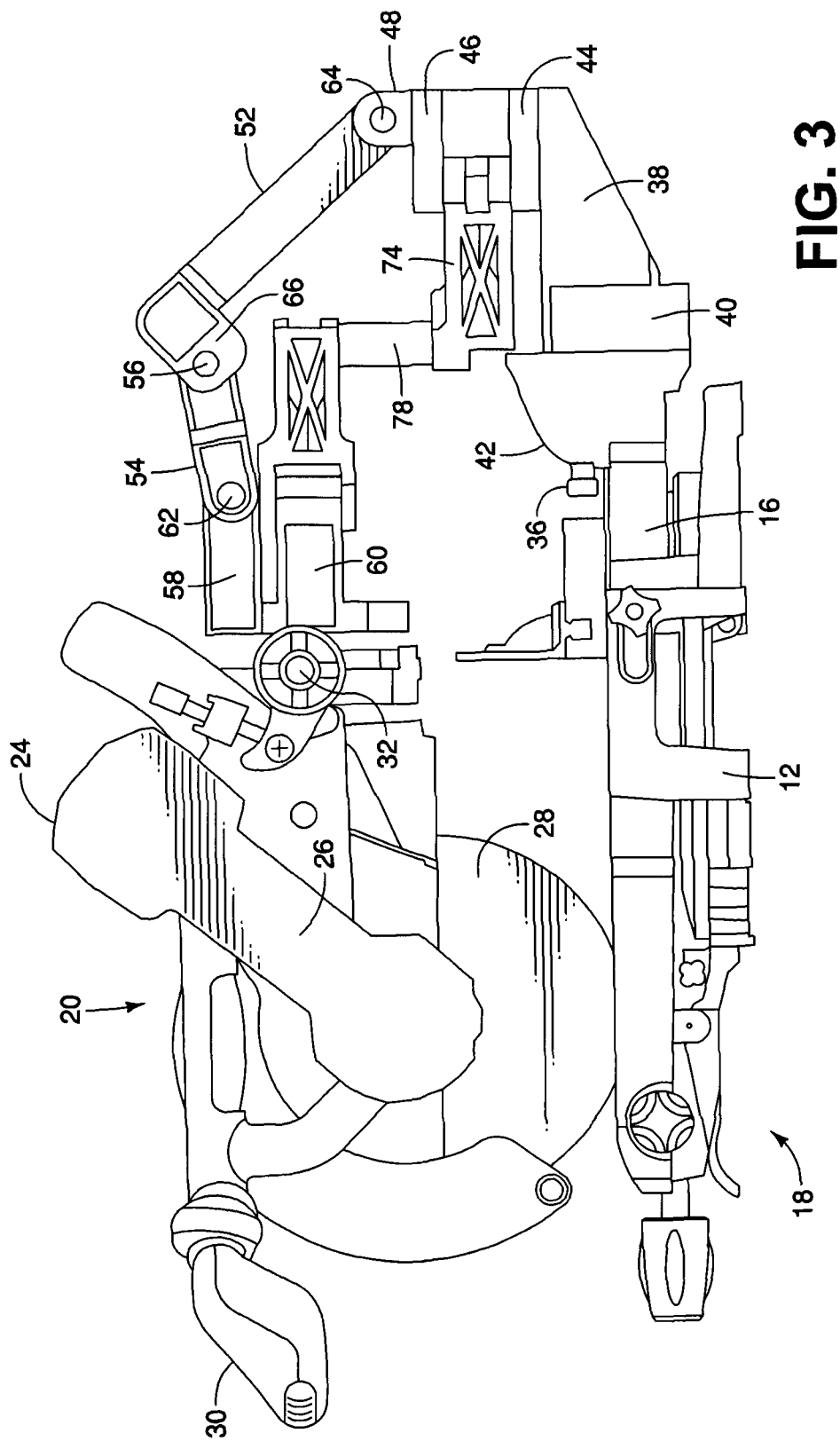
FIG. 3 is a side elevation of the embodiment shown in FIG. 1 with the saw blade in the extended position away from the fence.
Figure 4:
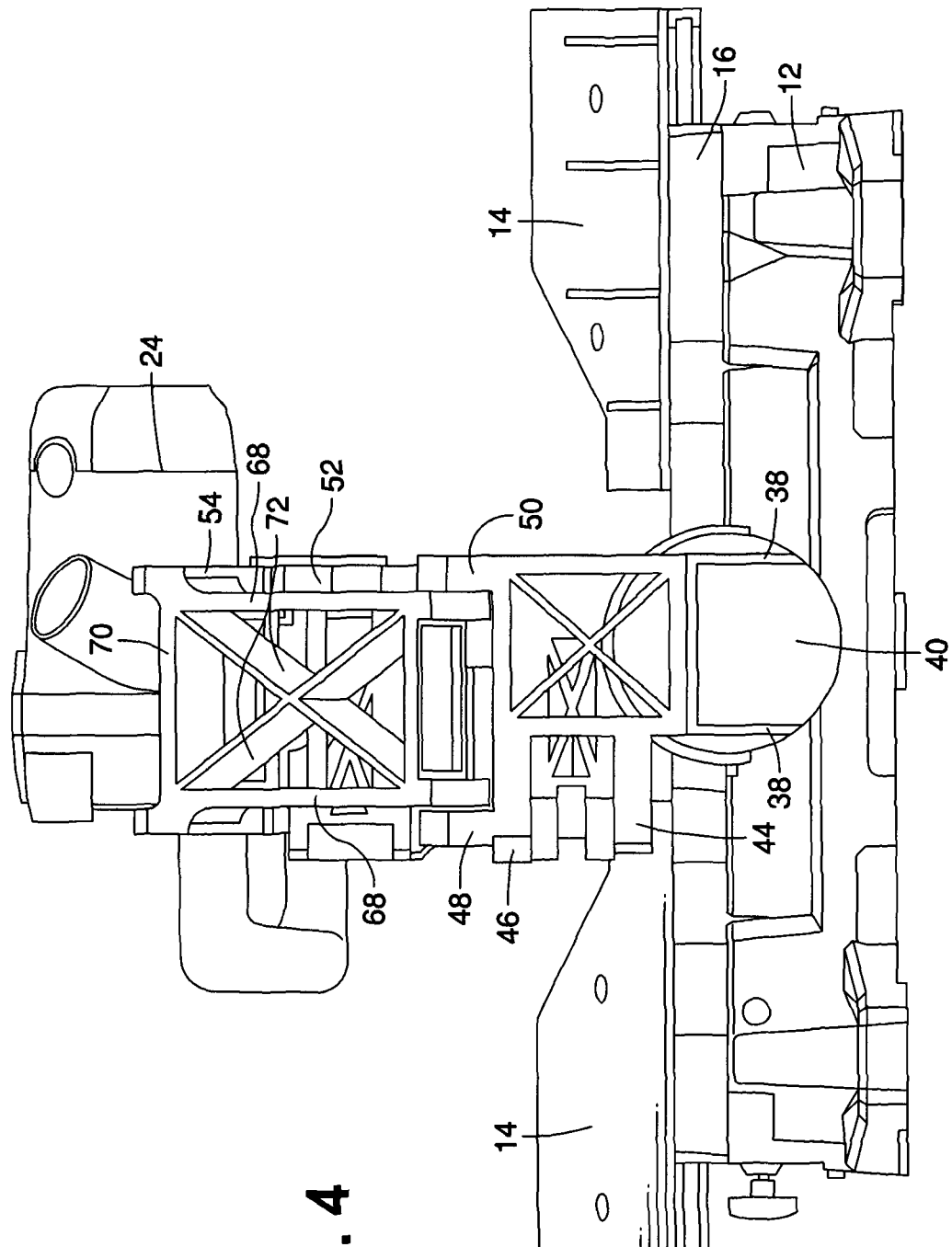
FIG. 4 is a rear view of the embodiment shown in FIG. 1, with the saw blade away from the fence.
Figure 5:
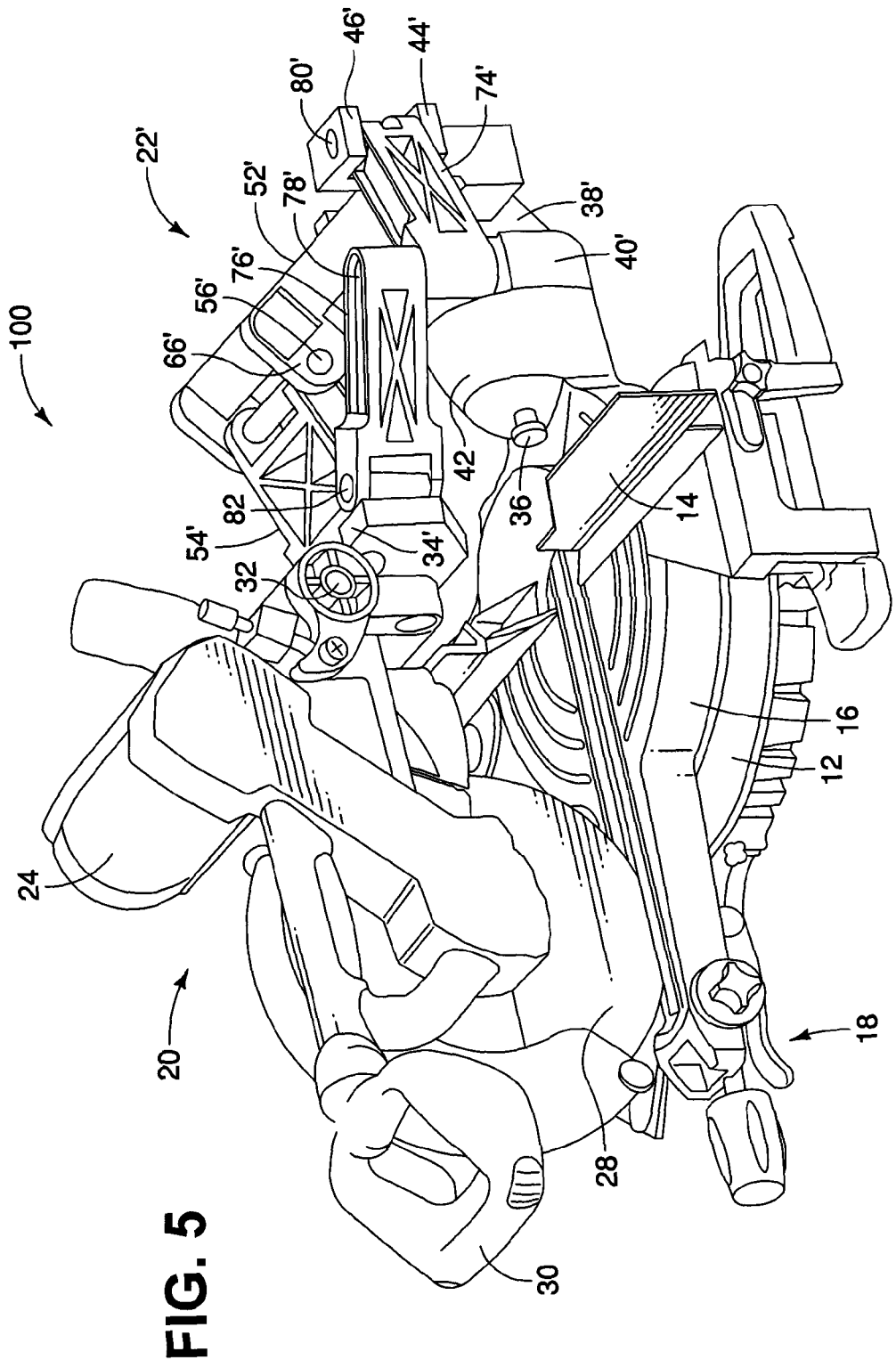
FIG. 5 is a right front perspective view of a second preferred embodiment of the present invention, particularly illustrating the saw blade being located in the extended position away from the fence.

As is best shown in FIGS. 1 and 2, the link 52 has a generally L-shaped side configuration with the transverse extension 66 having the aperture in which the shaft 56 is located. This permits the two links 52 and 54 to be folded together in a generally parallel arrangement as shown in FIG. 2 when the blade and motor assembly 20 is moved into its final cutting position where the blade is adjacent to the fence 14. As is best shown in FIG. 4, the width of the links 52 and 54 is relatively large and therefore the shafts 56, 62 and 64 that interconnect the links 52 and 54 with one another and with the saw pivot head 34 and support frame 38 are relatively long. This contributes to the desirable stiffness of the linear guide mechanism which substantially reduces, if not eliminates, any movement by the blade out of the cutting plane which can result in poor quality cutting. Stated in other words, the extremely wide links and their coupling to the saw pivot head and support frame 38 results in high rigidity reducing torsional and linear deflection of the saw blade away from its intended cutting plane which is very desirable from a cut quality standpoint.

As best shown in FIG. 4, the link 52 is not a solid construction, but has side walls 68 and end walls 70 with cross braces 72 provided to provide increased overall strength for the link. The link 54 is similarly constructed as is shown in FIG. 1, it also having similarly configured side walls, end walls and cross braces. The hinge links 52 and 54 are preferably die cast aluminum but can be steel stamping if desired.

The vertical hinge linkage is located below the horizontal hinge linkage and it comprises links 74 and 76 which have adjacent ends connected together by a vertical shaft 78. The links 74 and 76 are not as wide as the horizontal hinge links 52 and 54 for the reason that their functionality is to maintain the elevation of the saw pivot head 34 constant during movement of the blade and motor assembly 20 toward and away from the fence 14. Elevational deflections are not as critical for a miter saw cut quality for the reason that the work piece is generally being completely cut through.

The narrower links 74 and 76 are vertically displaced from one another which requires the elongated vertical shaft 78 to extend to interconnect them. The link 74 is located between the horizontal flanges 44 and 46 and is pivotally connected to these flanges by a shaft 80. Similarly, the link 76 has spaced flange portions that are connected to the flange 60 by a shaft 82. As is shown in FIG. 1, the flange 60 is located beneath the near flange 58 and the flanges 44 and 46 are also located beneath the vertical flanges 48 and 50, and the shaft 78 that interconnects the links 74 and 76 extends away or to the left side of the saw (as viewed from the handle 30) so that when the vertical and horizontal linkages are folded together as shown in FIG. 2, little if any portion of the links extend outside of the width of the flanges 48 and 50. This is significant in that changing of the bevel angle of the blade and motor assembly 20 can be accomplished in either the left or right direction and the hinge linkages will not interfere with the dual bevel adjusting capability.

It should also be apparent from FIG. 2 that when the blade and motor assembly 20 are moved as far toward the fence 14 as is possible, the linkages do not extend in any rearward direction beyond the original position end of the support frame 38. This enables the miter saw to be placed near a wall, for example, and be fully operational, unlike many conventional sliding rod and bushing configurations of compound miter saws.

A second preferred embodiment is shown in FIGS. 5-8 and have many similar components as the embodiment shown in FIGS. 1-4. In the following description, components that are labeled with the same numbers as those shown and described with regard to the first preferred embodiment are substantially similar in their design, configuration and operation and therefore will not be described in detail. Components with reference numbers having a prime or double prime designation are similar to those that are identified with regard to the embodiment shown in FIGS. 1-4, but may have some structural differences which are apparent or which will be generally described, or which will be given different numbers than those illustrated in FIGS. 1-4.

Figure 6:
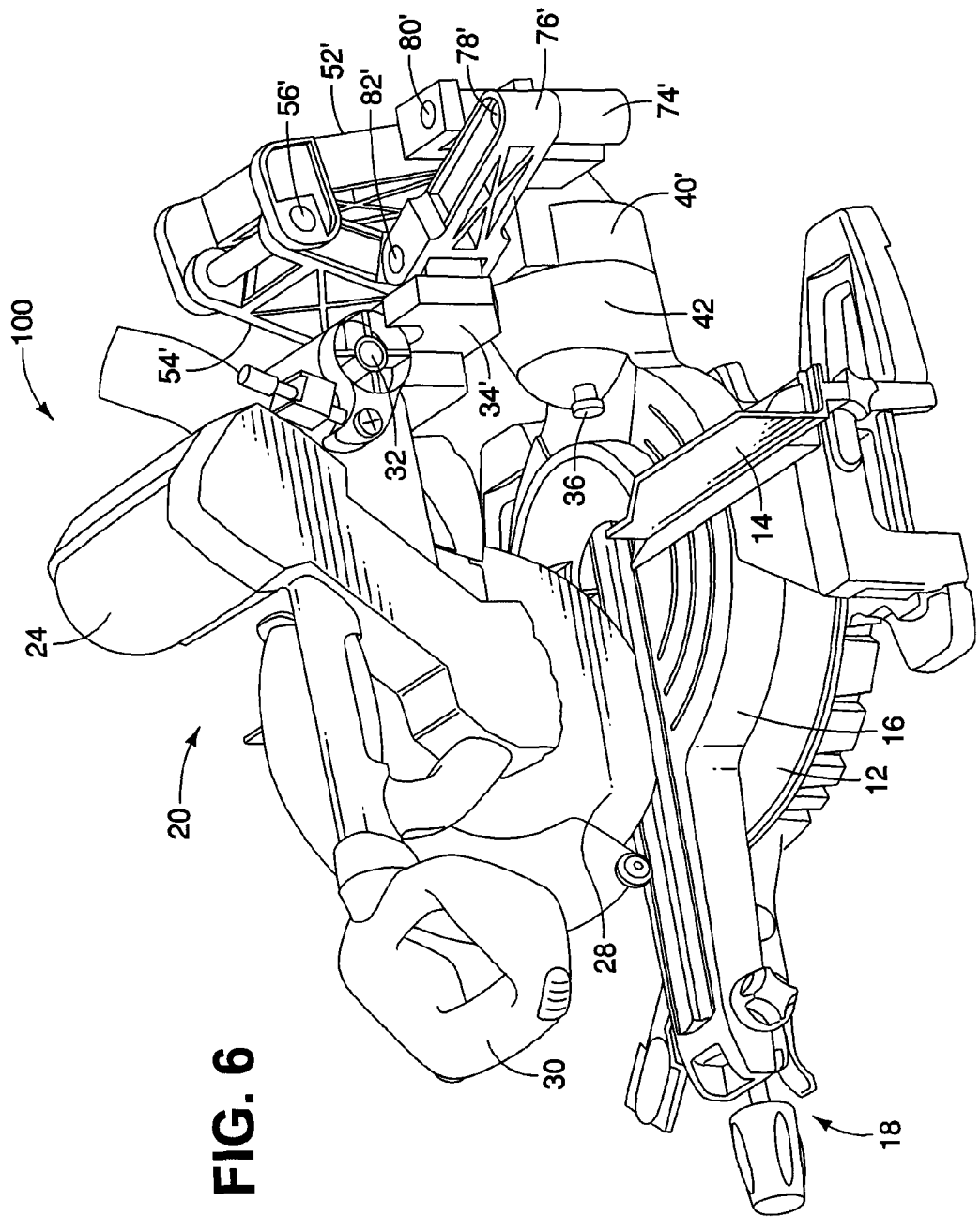
FIG. 6 is a right front perspective view of the embodiment shown in FIG. 5, but illustrating the saw blade in a position near the fence.
Figure 7:
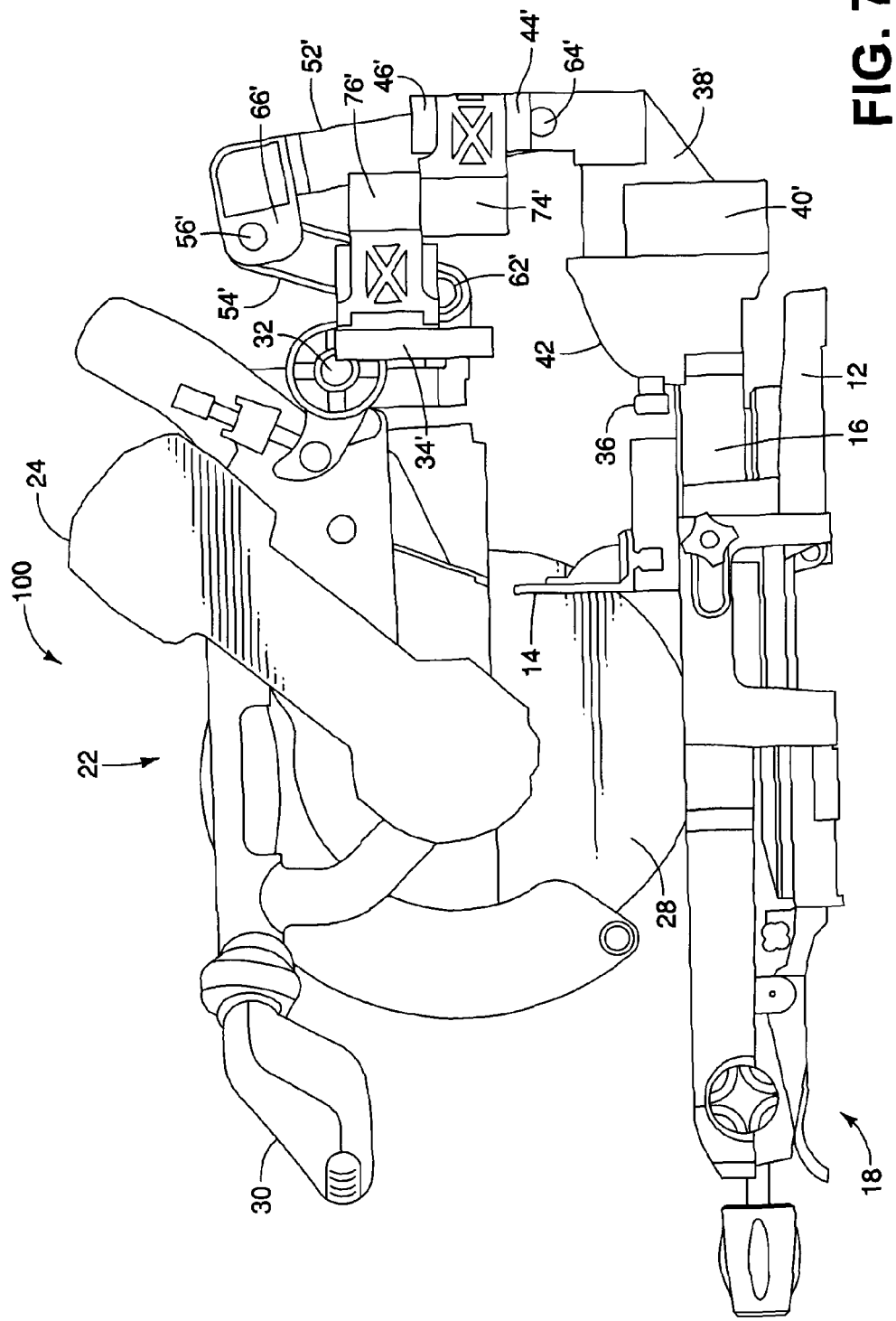
FIG. 7 is a side elevation of the embodiment shown in FIG. 5 but illustrating the saw blade in a position near the fence.
Figure 8:
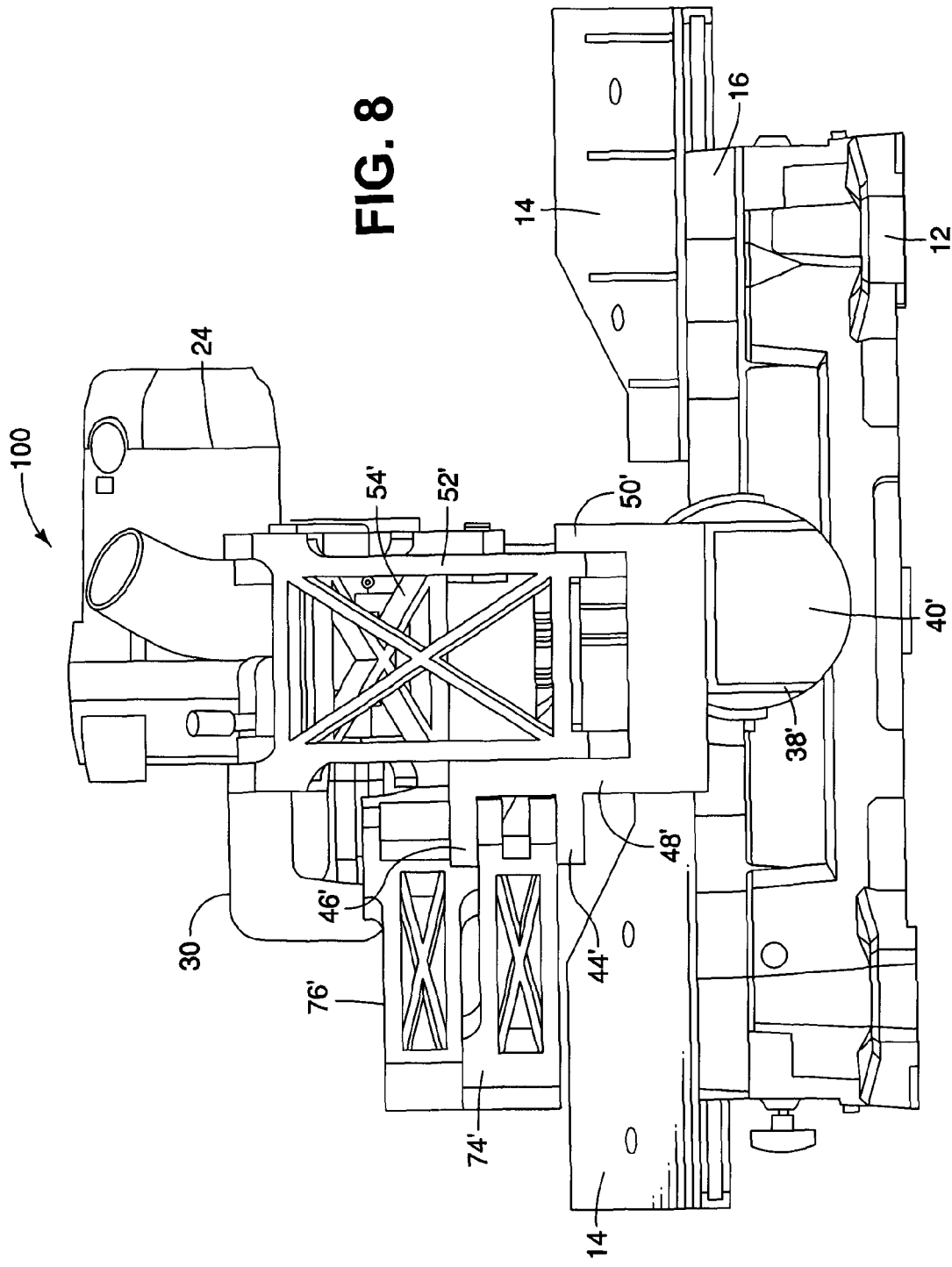
FIG. 8 is a rear view of the embodiment shown in FIG. 5, with the saw blade in a position away from the fence.
Figure 9:
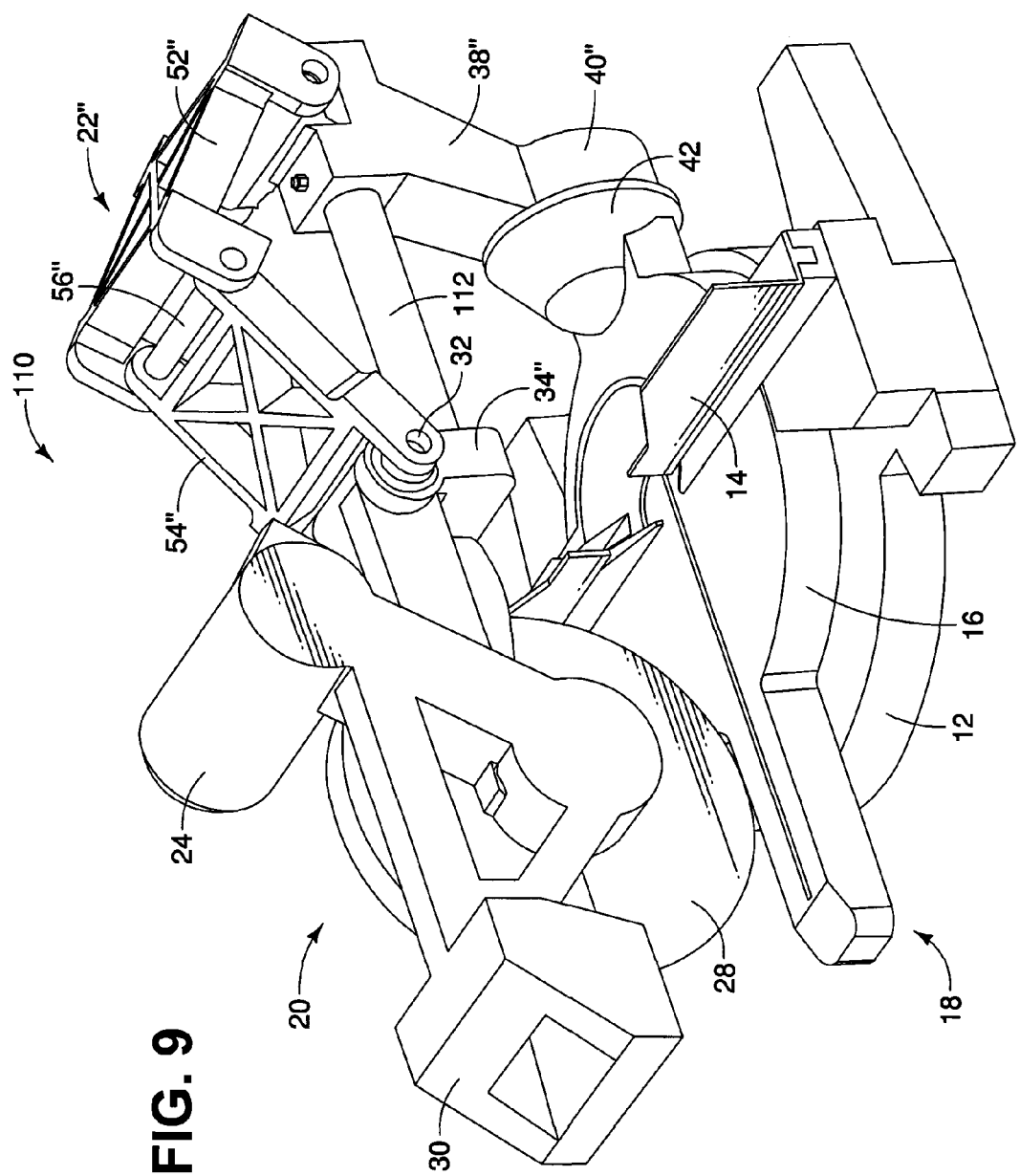
FIG. 9 is a third preferred embodiment of the present invention, particularly illustrating the saw blade being located in the extended position away from the fence.
Figure 10:
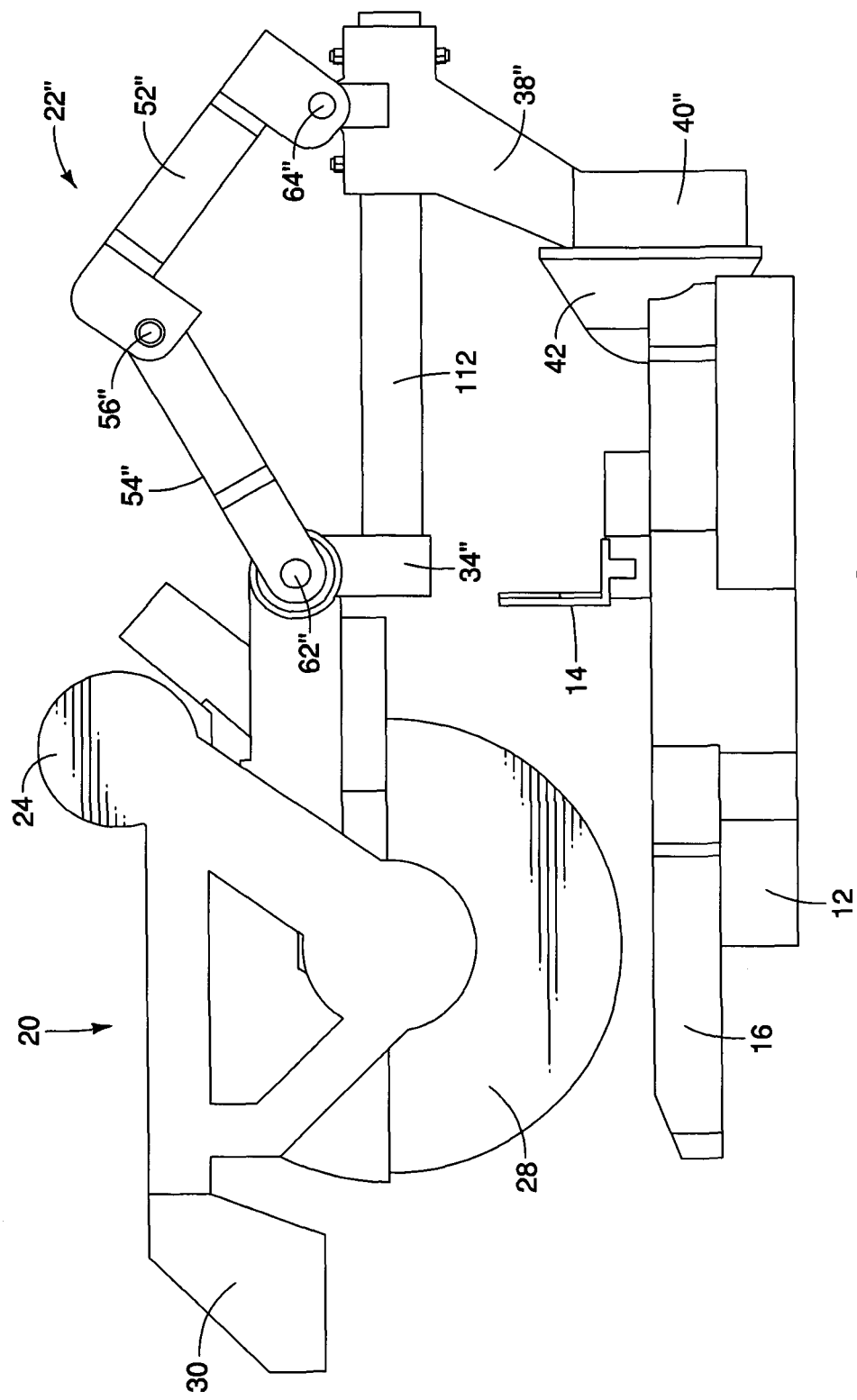
FIG. 10 is a side elevation of the embodiment shown in FIG. 9 with the saw blade in the extended position away from the fence.
Figure 11:
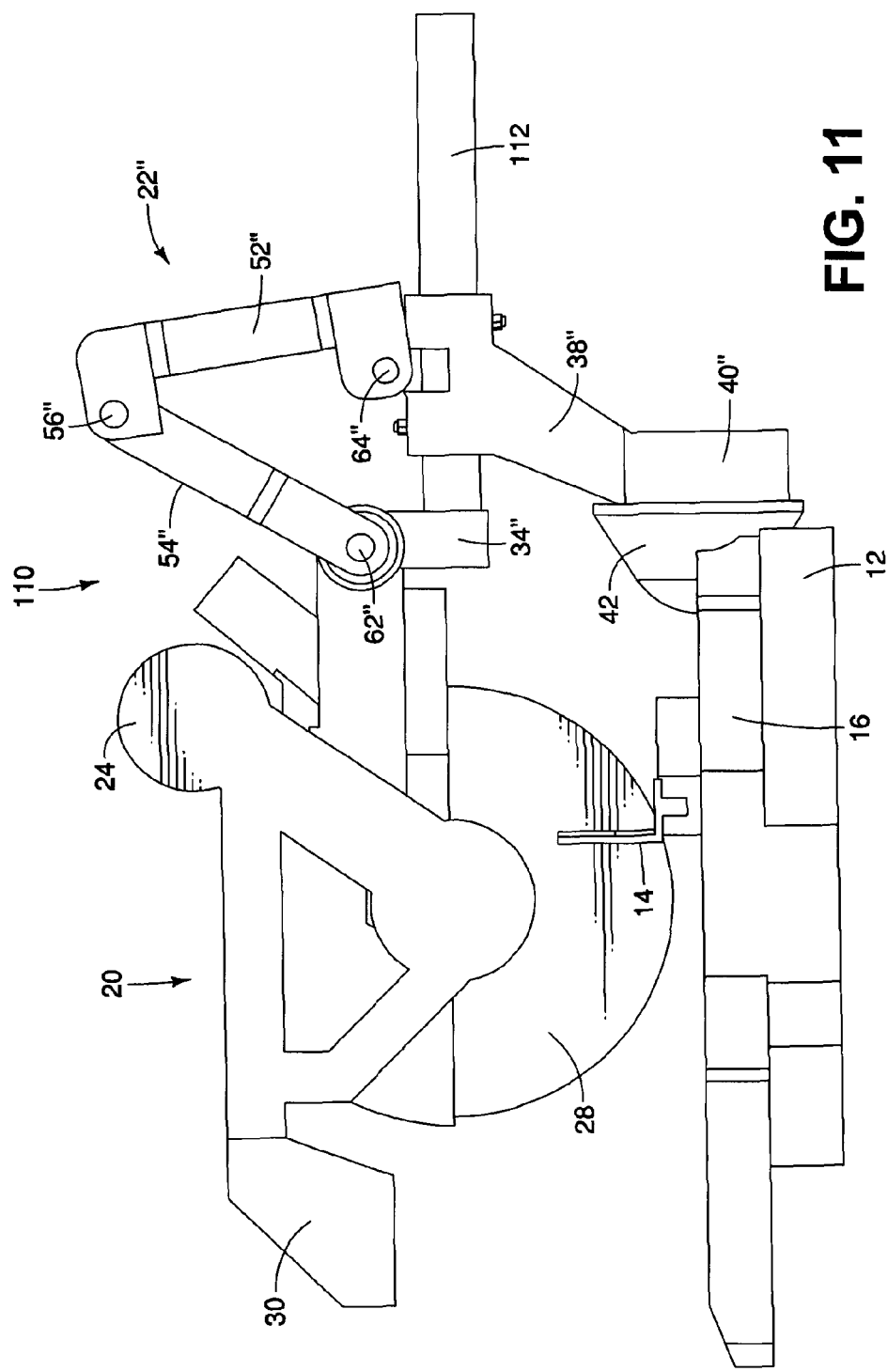
FIG. 11 is another side elevation of the embodiment shown in FIG. 9, with the saw blade near the fence.
Figure 12:
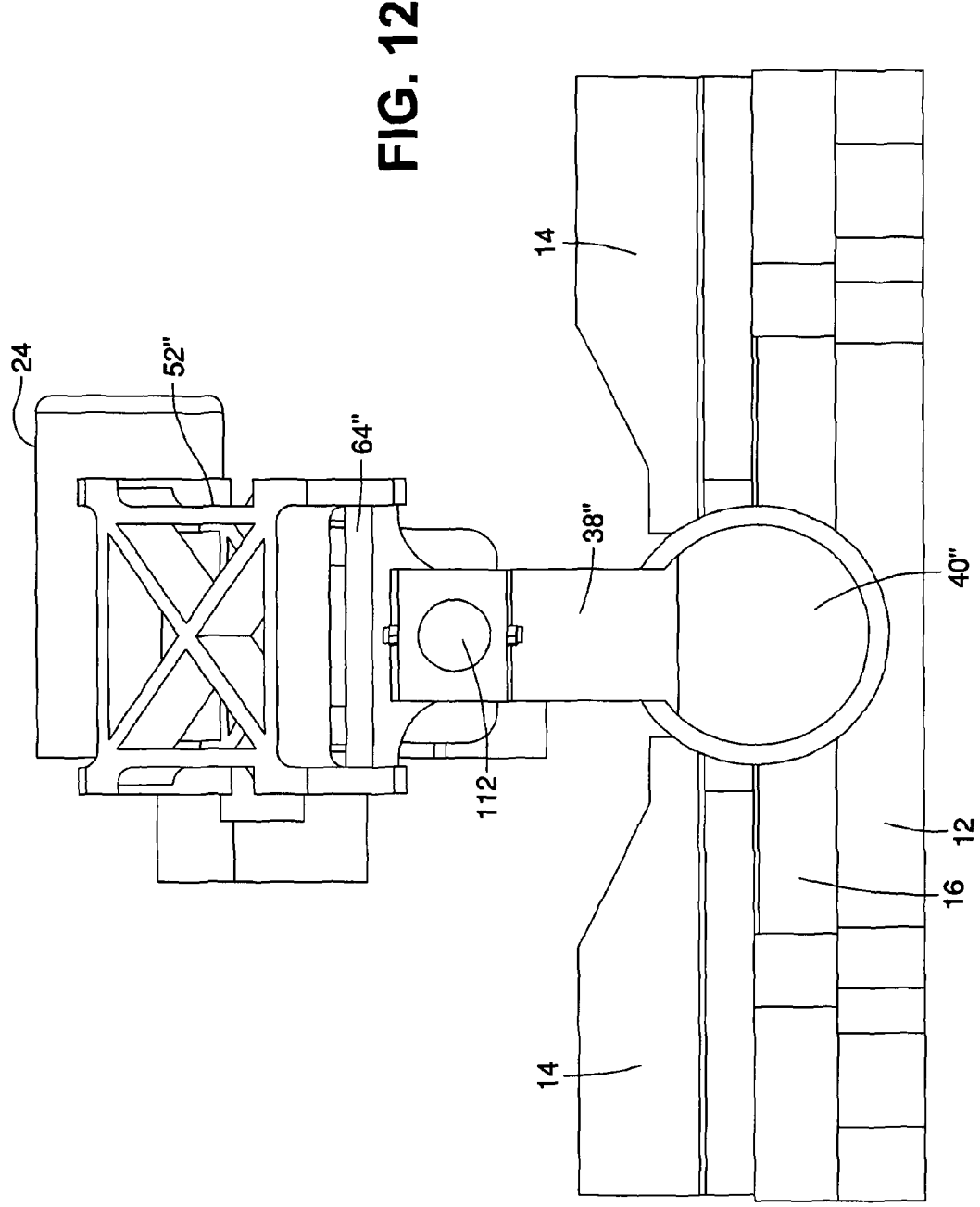
FIG. 12 is a rear view of the embodiment shown in FIG. 9, with the saw blade located away the fence.

The second preferred embodiment is indicated generally at 100 in FIGS. 5-8 and has many similarities to the first preferred embodiment, but while the first embodiment is a dual bevel configuration saw, the second embodiment saw 100 is a single bevel configuration. The links 74' and 76' are connected together by a shaft 78' that is not as long as the shaft 78 of the first preferred embodiment, because the links 74' and 76' are vertically adjacent one another rather than being spaced apart. Also, the link 76' is at an elevation that is substantially similar to the elevation of the link 54' and therefore unable to fold toward the link 52" and 54'. Thus, the connection between link 74' and 76' extends outwardly away from the links 52' and 54'. Because of the outward extension, particularly when it is folded as shown in FIGS. 6 and 8, the links interfere with other portions of the saw 100 when the saw would be pivoted in the counterclockwise direction as shown in FIG. 8. Therefore, the single bevel operation of this second preferred embodiment is in the clockwise direction as shown in FIG. 8.

A third preferred embodiment of the invention is the saw 110 that is shown in FIGS. 9-12 is less detail than the embodiments of FIGS. 1-8. Saw 110 has a horizontal hinge linkage comprising links 52" and 54" that are interconnected and operate substantially similar to those described in the embodiments of FIGS. 1-8. The saw pivot head 34" has a slightly different configuration and the end of the link 54" is connected to the saw pivot shaft 32 which is also journaled in the saw pivot head 34". An elongated rod 112 is journaled in a bushing (not shown but located in the upper end of support frame 38) and maintains the saw pivot head 34" at a constant elevation as the blade and motor assembly 22 moves the blade 28 toward the fence 14. Only one rod 112 is provided for the reason that control of the saw blade cutting plane is provided by the horizontal hinge linkage, as is the case with the other embodiments shown in FIGS. 1-8, and the only function that is performed by the rod 112 is to keep the pivot head 34" at a constant elevation during operation. In this regard, the blade and motor assembly 20 is shown in its retracted position in FIGS. 9 and 10 and in the cutting position in FIG. 11 where the blade 28 is adjacent the fence 14. In the position shown in FIG. 11, it is apparent that the rod 112 will extend beyond the rear surface of the support frame 38" which requires a larger footprint in that it would not be possible to place the saw 110 with the support frame 38" located close to a wall or other similar surface. Thus, while this embodiment does not have the space advantages of the first and second preferred embodiments, this embodiment has the advantage of controlling the saw blade cutting plane by a generally horizontal hinge as is achieved in all embodiments and only one rod and bushing combination is required which provides a cost benefit compared to conventional arrangements which have a pair of rod and bushing configurations.

In accordance with a another described embodiment of the invention, a miter saw is shown in FIGS. 13-19 and is indicated generally at 200. This embodiment is also described in related U.S. application Ser. No. 13/194,687, which is hereby incorporated by reference it its entirety. Many of the components are similar to the first embodiment 10 so that where reference numbers are the same as the description of the FIG. 1, such components and their functionality are very similar, if not identical. Components with reference numbers above 200 are sufficiently different from analogous components of the other embodiments to warrant separate numbers or are new in the fourth preferred embodiment.

Figure 13:
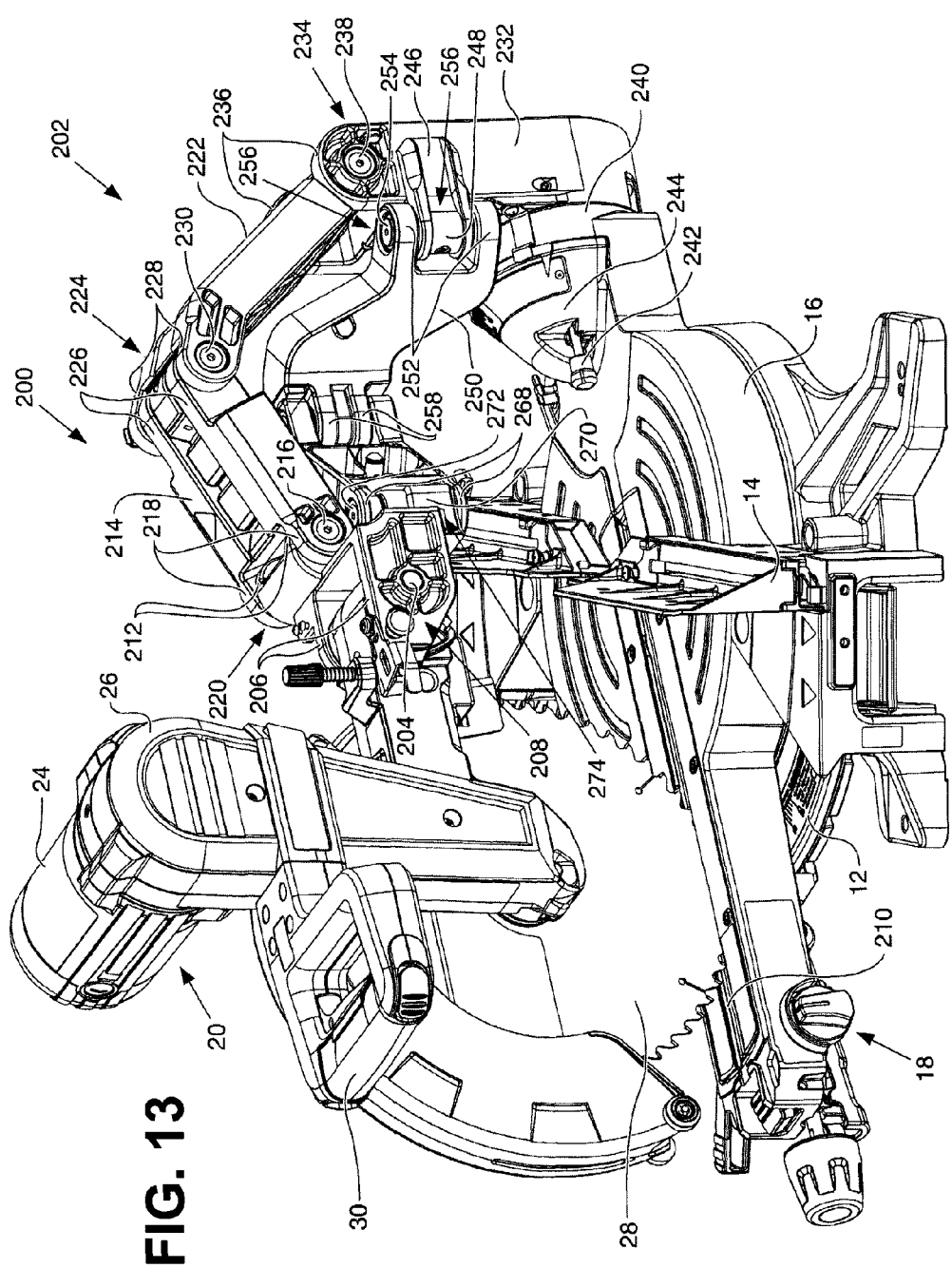
FIG. 13 is a perspective view of the right side of a miter saw, with the blade and motor assembly in an extended and lowered position, in accordance with another embodiment of the invention.
Figure 14:
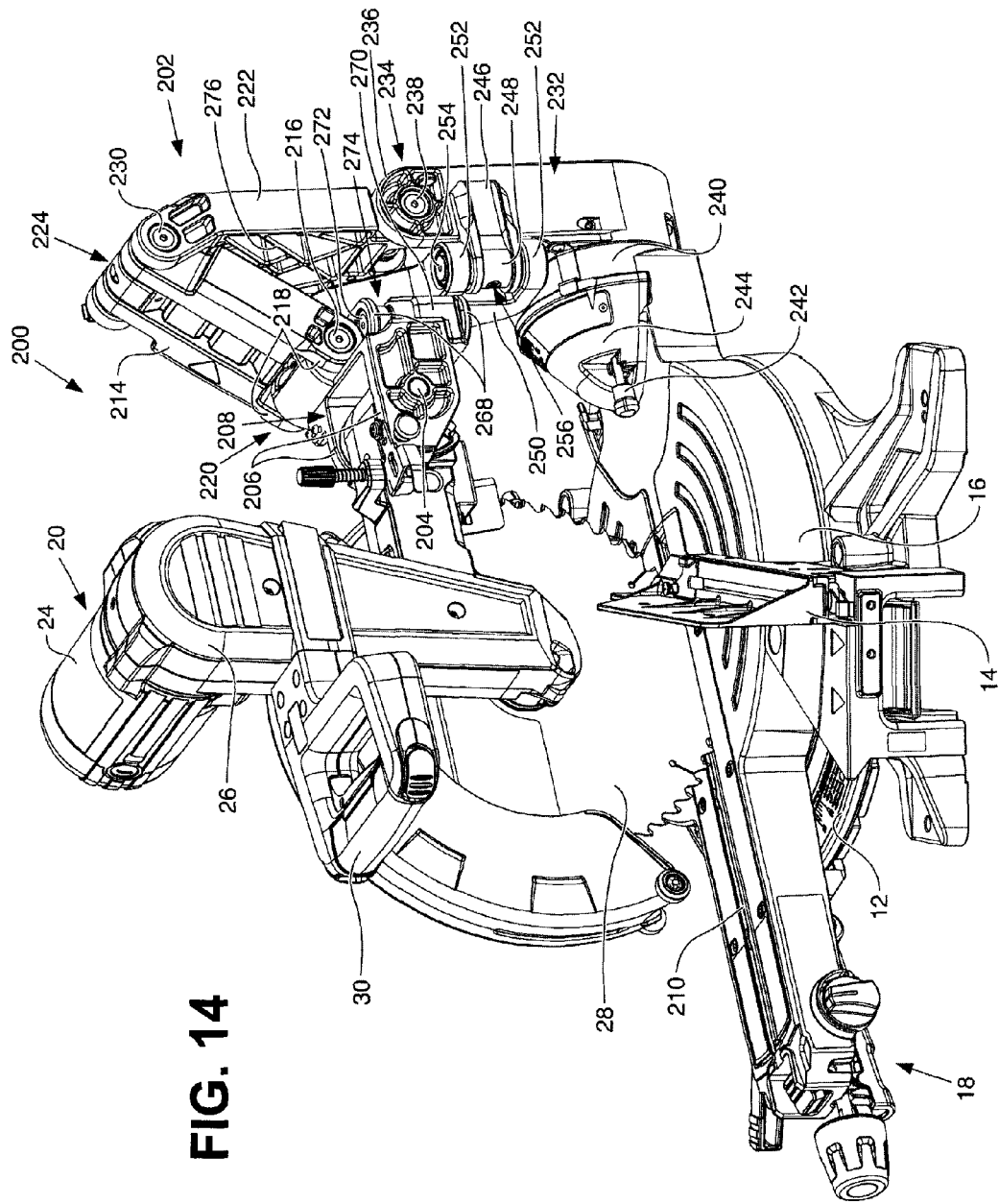
FIG. 14 is a perspective view of the right side of the miter saw shown in FIG. 13, with the blade and motor assembly in a retracted and lowered position.

Turning to FIGS. 13 and 14, the miter saw 200 also has a generally circular base 12 with an attached fence 14. The base 12 supports a rotatable table 16 that has a miter arm control assembly, indicated generally at 18, for adjusting the rotational position of the table for setting the miter angle of a workpiece that would be placed on the table. A saw blade and motor assembly, indicated generally at 20, is operatively connected to the table 16 by a linear guide mechanism, indicated generally at 202. The saw blade and motor assembly 20 has an electric motor 24 that is operably connected through a belt and gear mechanism (not shown), but located within the housing portion 26 that drives a saw blade 28. A handle 30 enables the operator to move the blade and motor assembly 20 into and out of engagement with a workpiece (not shown) that is placed on the table 16 adjacent the fence 14.

The blade and motor assembly 20 is pivotable about a saw pivot connection shaft 204 extending between a pair of spaced outer flanges 206 on a pivot head 208. When the handle 30 is lowered by an operator, the blade 28 will be lowered into its cutting position and slightly penetrates a slot 210 formed in the table 16. The pivot head 208 also has a pair of spaced inner flanges 212 (best shown in FIG. 13) that extend in the opposite direction from the outer flanges 206 that are connected to the blade and motor assembly 20, and offset from the center of the pivot head 208, opposite one of the outer flanges 206. The inner flanges 212 are provided between a pair of spaced outer flanges 218 extending from one end of a first horizontal link 214. A pivot connection shaft 216 extends horizontally through holes in the inner and outer flanges 212 and 218 to pivotally connect the inner and the outer flanges 212, 218. Together the inner flanges 212 of the pivot head 208, the pivot connection shaft 216 and the outer flanges 218 of the first horizontal link 214 form a horizontal hinge connection 220.

At the opposite end from the horizontal hinge connection 220, the first horizontal link 214 is connected to a slightly longer second horizontal link 222 by another horizontal hinge connection 224. It should be understood, however, that the miter saw 200 may include one or more additional horizontal links that may be connected to the first and second links 214, 222 without departing from the scope of the patent. Included in the hinge connection 224 is a pair of spaced inner flanges 226 that extend from the end of the first horizontal link 214 opposite the end having outer flanges 218. The inner flanges 226 are provided between and pivotally connected to a pair of spaced outer flanges 228 extending from the upper end portion of the second horizontal link 222, by a pivot connection shaft 230.

The second horizontal link 222 has its lower end portion connected to a vertical support 232 by a horizontal hinge connection 234. The hinge connection 234 includes a pair of spaced outer flanges 236 (best shown in FIG. 15) extending from the top of the vertical support 232 and a pair of inner flanges (not shown) extending from the lower end of the horizontal link 222 and provided between the outer flanges of the vertical support. A pivot connection shaft 238 extends through the outer flanges 236 of the vertical support 232 and the inner flanges of the second horizontal link 222 for a pivotal connection. The outer flanges 228 of the second horizontal link 222 in the hinge connection 224 extends at an angle of approximately 30 degrees from the generally linear longitudinal portion of the second horizontal link to enable the first horizontal link 214 to be folded close to the second horizontal link, as shown in FIG. 14. It is to be understood that the angle other than the described above may be utilized as well.

Figure 16:
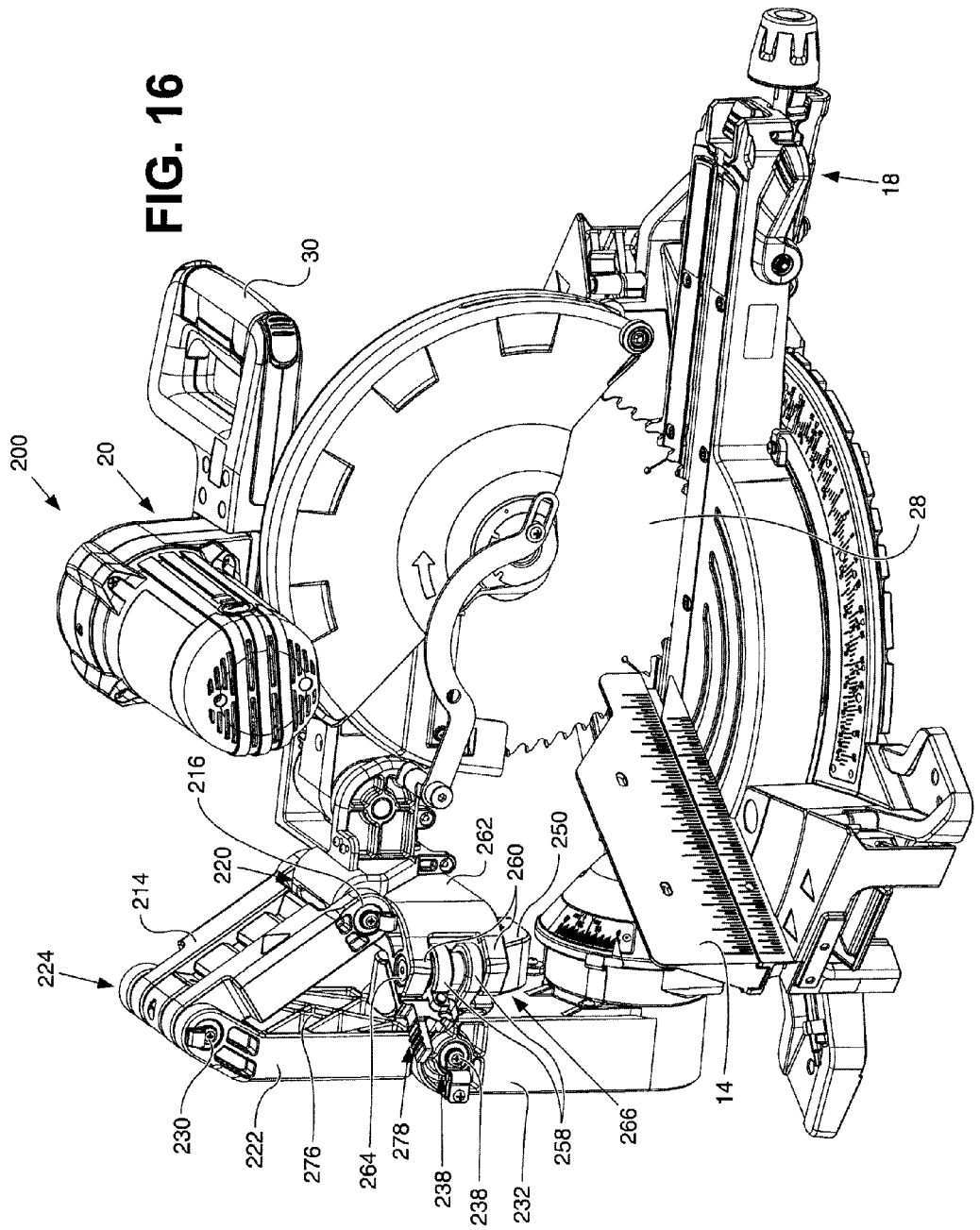
FIG. 16 is a perspective view of the left side of the miter saw shown in FIG. 13, with the blade and motor assembly in the retracted and lowered position.

As is best shown in FIGS. 14 and 16, when the blade and motor assembly 20 is in its retracted position, the second horizontal link 222 is in a generally vertical orientation. It should be appreciated that the horizontal pivot connection shafts 216, 230, 238, and the corresponding hinge connections 220, 224, 234, are oriented parallel to one another and substantially perpendicular to the plane of the blade 28. The first and second horizontal links 214, 222 are relatively wide, approximately 80 to 160 millimeters and the thickness of them is substantial, approximately 10 to 80 millimeters so that they resist bending which would detrimentally affect the quality of the cut by the blade 28. The length of the first horizontal link 214 is approximately ¾ of the length of the second horizontal link 222. In one embodiment, the length of the first horizontal link 214 is approximately 120 to 220 millimeters and that of the second horizontal link 222 is approximately 200 to 300 millimeters so that the point of the blade 28 that make contact with the workpiece is at a sufficient distance from the fence 14 to cut the intended workpiece, but before the contact point reaches the end of the slot 210 provided in the table 210. Of course, it should be understood that the width, the thickness, and the length of the first and second links 214, 222 other than those described above may be utilized as well.

The vertical support 232 is integrally formed with a support frame 240 that is generally cylindrically shaped. Of course, the support frame 240 may take the form of various shapes and have a number of different sizes. A bevel pivot shaft 242 supported by an extension 244 of the table 16 enables the support frame 240 and the vertical support 232 to pivot either to the left or right of the plane of the blade 28 for the purpose of providing bevel cuts. The vertical support 232 also has a side mounting structure 246 with a pivot block 248 for pivotally supporting an angled first vertical link 250, which has a pair of outer flanges 252 at one end. The pivot block 248 is provided between and connected to the two outer flanges 252 of the first vertical link 250 by a vertical pivot connection shaft 254 that extends through the holes formed in the outer flanges and the pivot block. The outer flanges 252, the pivot block 248 and the pivot connection shaft 254 combine to form a vertical hinge connection 256. It should be noted that the pivot block 248 can be an integral part of the vertical support 232, or it can be a separate component that is affixed to the vertical support 232.

Figure 15:
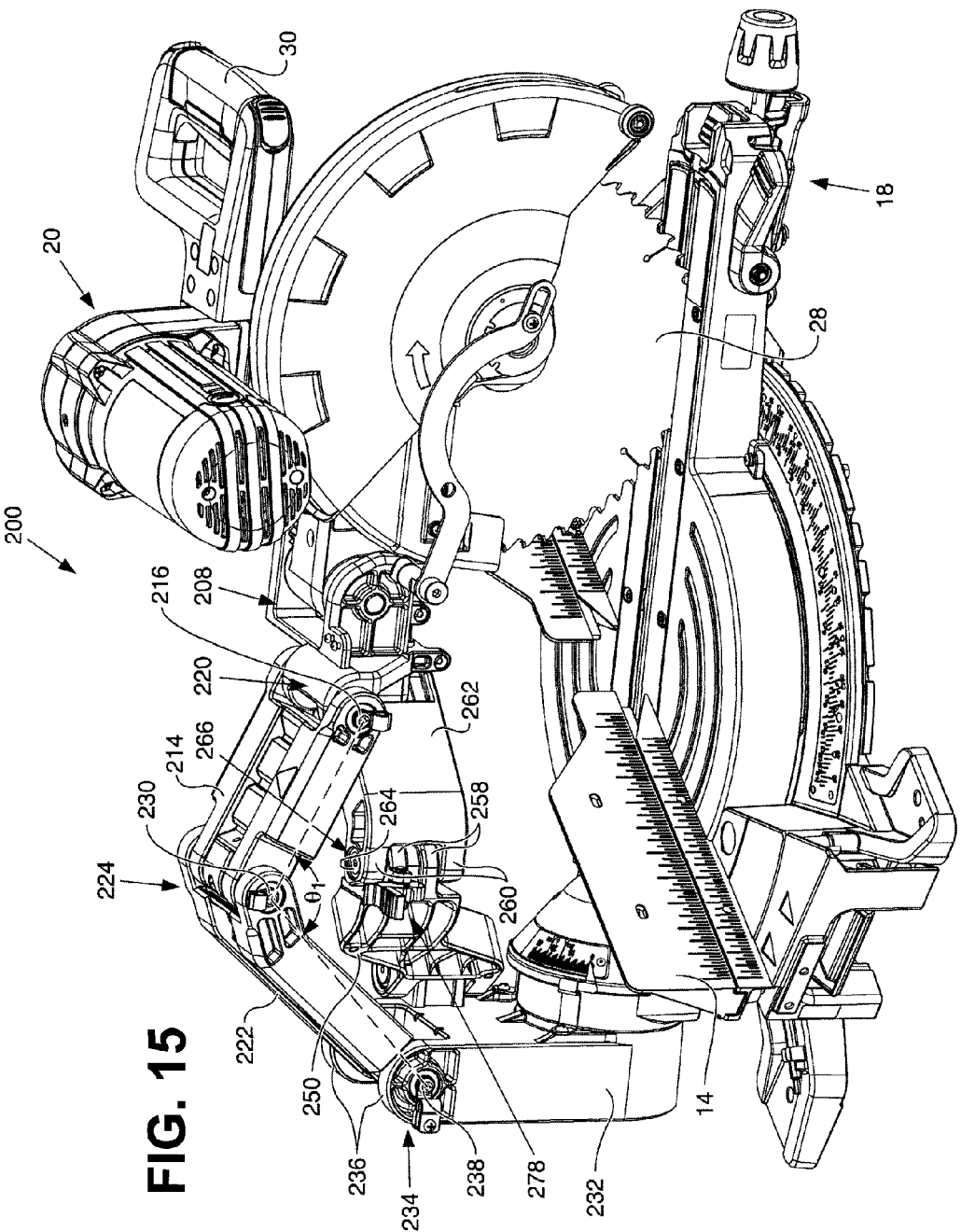
FIG. 15 is a perspective view of the left side of the miter saw shown in FIG. 13, with the blade and motor assembly in an extended position.

Referring to FIGS. 13, 15 and 16, the first vertical link 250 has a pair of spaced inner flanges 258 extending from the end opposite the end having the outer flanges 252. The inner flanges 258 are provided between a pair of spaced outer flanges 260 extending from a second vertical link 262. A vertical pivot connection shaft 264 extends through the aligned holes in the inner and outer flanges 258, 260 to pivotally connect the first and second vertical links 250, 260 together and form a vertical hinge connection 266. While the inner flanges 258 are described as being "spaced," it should be understood that they are not necessarily separated. They can also be integrally connected by a somewhat narrower piece provided between the flanges 258. Alternatively, the inner flanges 258 can also be replaced with one cylindrical piece protruding from the end of the link 250. As best shown in FIG. 15, the outer and the inner flanges 260, 258 of the second vertical link 262 and the first vertical link 250 extend at a slight angle from the linear portion of each of the first and second vertical links 250,262 to enable the first and second vertical links 250, 262 to be folded close to each other, as shown in FIG. 16. Preferably, the flanges 258, 260 should extend at an angle of approximately 30 to 120 degrees relative to the linear portion of the respective first and second vertical links. It is to be understood that the angle other than the described above may be utilized as well.

At the opposite end from the outer flanges 260, a pair of spaced outer flanges 268 extend from the second vertical link 262 and are pivotally connected to a pivot block 270 provided between the two outer flanges by a vertically oriented pivot connection shaft 272 (best shown in FIGS. 13 and 14), thereby forming another vertical hinge connection 274. The pivot block 270 is attached to the pivot head 208 on the opposite side from the outer flanges 206 and adjacent the inner flanges 212 of the pivot head.

As with the embodiment shown in FIG. 13, the vertical pivot connection shafts 254, 264, 272 maintain the elevation of the pivot head 206 substantially constant relative to the table 16. The length of the first vertical link 250 is approximately the same as the length of the second vertical link 262, and each of the first and second vertical links 250, 262 are approximately 7/10 of the length of the second horizontal link 222. In one embodiment, the length of the first vertical link 250 is approximately 120 to 220 millimeters and that of the second vertical link 262 is also approximately 120 to 220 millimeters. The width and thickness of the first and second vertical links 250, 262 are comparable to the first and second horizontal links 214, 222. However, the amount of possible bending of the vertical links 250, 262 is not as critical as bending that could occur with the horizontal links 214, 222 inasmuch as the quality of a cut is generally not affected by vertical movement of the blade during extension and retraction because the blade penetrates the slot 210 during most cutting operations. Of course, it is to be understood that the width, the thickness, and the length of the first and second links 214, 222 other than those described above may be utilized as well. As is evident from the drawings, the horizontal and vertical links 214, 222, 250, 262 are not solid but may be constructed from cast of aluminum and have reinforcing ribs 276 (best shown in FIG. 14) that extend across the interior of the links to impart additional strength. In some embodiments, the horizontal and vertical links 214, 222, 250, 262 may be constructed from steel stamping, sheet metal, or any high strength plastic.

Additional structural strength is provided with the fourth embodiment for the reason that all the horizontal and the vertical hinge connections 220, 224, 234, 256, 266, 274 have outer flanges that fit outside a pair of inner flanges or pivot blocks, which support each the horizontal and vertical links 214, 222, 250, 262 at both ends rather than an overhung load connection. The double-ended support provides a stronger connection that imparts an increased strength to the links. The horizontal and vertical pivot connection shafts 216, 230, 238, 254, 264, 272 are, therefore, also supported at opposite ends, which is a stronger connection.

In the described fourth embodiment, the vertical hinge connection 256 at the lower end of the first vertical link 250 is provided at the top portion of the vertical support 232 (not including the outer flanges 236) and is slightly below the vertical hinge connection 266 at the other end of the vertical link 250 (best shown in FIG. 14). Accordingly, the vertical link 250 extends at an angle between the vertical hinge connections 256 and 266. It should be understood, however, that the length of the vertical support 232 may be increased so that the location of the pivot block 248, and accordingly, the vertical hinge connection 256, may be at the same height as the vertical hinge connection 266. In other words, the first vertical link 250 may extend substantially parallel to the table top 16 as is the second vertical link 262. However, with this arrangement, there may be an issue of the miter saw 200 being undesirably top heavy.

Another consideration is that the angle between the first and second horizontal links 214, 222 as determined by the line of action between a line extending through pivot connection shafts 230 and 216 in the horizontal hinge connections 224 and 220 relative to the line of action through pivot connection shafts 230 and 238 in the horizontal hinge connections 224 and 234, identified as angle $\theta_1$ in FIG. 15 should be less than 130° when the saw is fully extended to prevent a toggle action of the links. While not shown, the angle between the first and second vertical links 250 and 262 as determined by the line of action between a line extending through vertically oriented pivot connection shafts 264 and 254 in the vertical hinge connections 266 and 256 relative to the line of action through vertical pivot connection shafts 264 and 272 in the vertical hinge connections 266 and 274, also should be less than 130° when the saw is fully extended to prevent a toggle action of the links. The toggle action is defined herein to mean an increased necessary force to push the blade and motor assembly 20 from its extended position, shown in FIGS. 13 and 15 toward the retracted position shown in FIGS. 14 and 16. If a toggle action is experienced, a greater noticeable and appreciable force is required to start the movement. If the angles of the links are less than 130°, such toggle action is not experienced.

During operation, an operator places a workpiece on the table 16, brings the handle 30 down into cutting position either before or after activating the motor 24, as shown in FIGS. 13 and 15, and then pushes the handle 30 toward the fence 14 to have the blade 28 cut the workpiece. At the end of the cut, the blade and motor assembly 20 would be essentially in the position shown in FIGS. 14 and 16, where the bottom reach of the blade 28 is generally coextensive with the fence 14.

Figure 19:
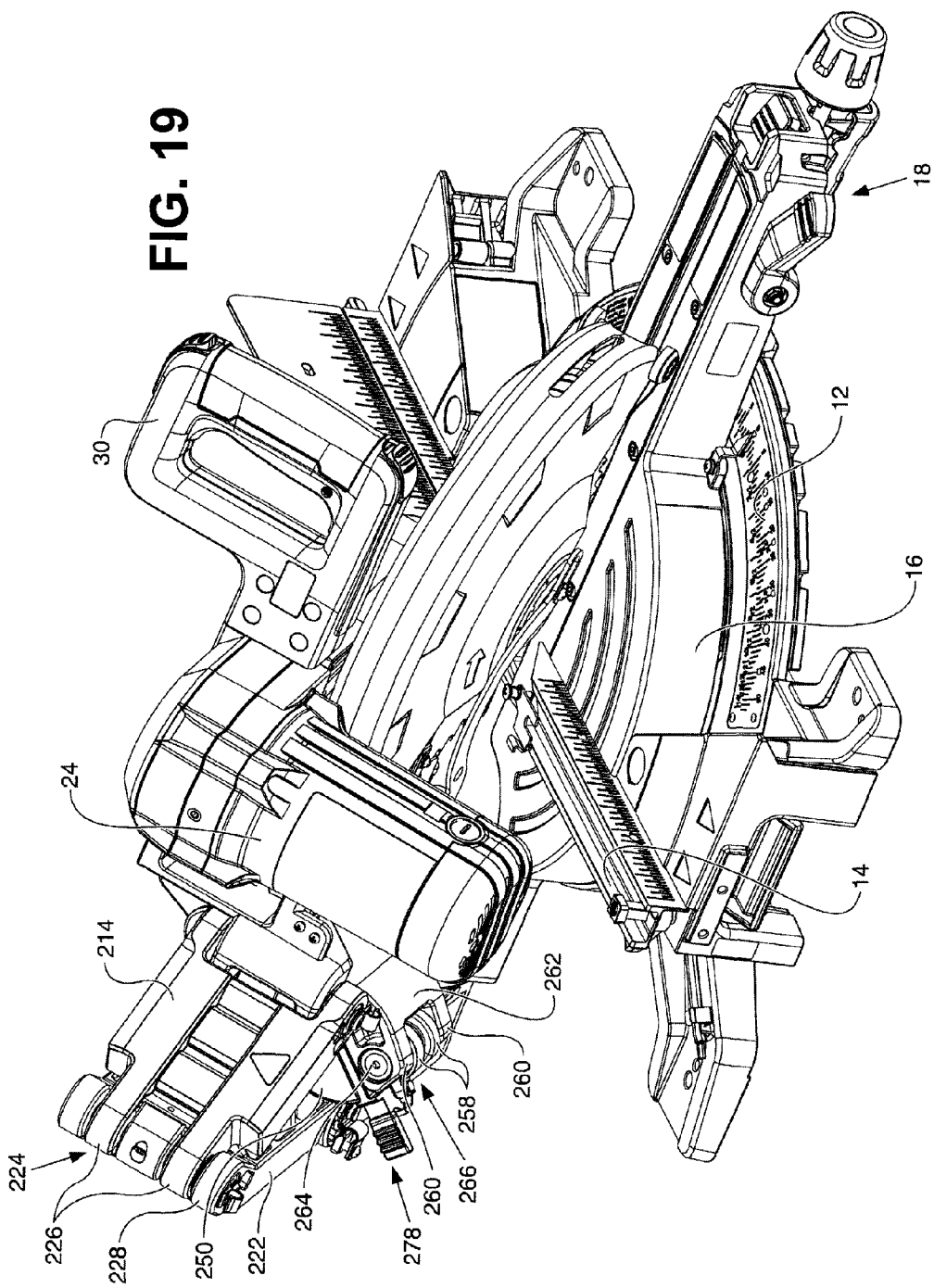
FIG. 19 is a perspective view of the left side of the miter saw shown in FIG. 13, with the blade and motor assembly beveled to the left side.

As is shown in FIGS. 15 and 16, the first and second vertical links 250, 262 are located beneath the first and second horizontal links 214, 222 and the vertical connection hinge 266 that interconnects the vertical links extends away or to the left side of the saw (as viewed from the handle 30). In this manner, when the saw 200 is in a retracted position and the vertical and horizontal links 214, 222, 250, 262 are folded together, as shown in FIGS. 16-19, only a small portion (e.g., approximately 20 to 100 millimeters) of the vertical links 250, 262 extend outside of the width of the horizontal links 214, 222. This is significant in that changing of the bevel angle of the blade and motor assembly 20 can be accomplished in either the left or right direction and the vertical links 250, 262 will not interfere with the dual bevel adjusting capability, as illustrated in FIG. 19.

Figure 17:
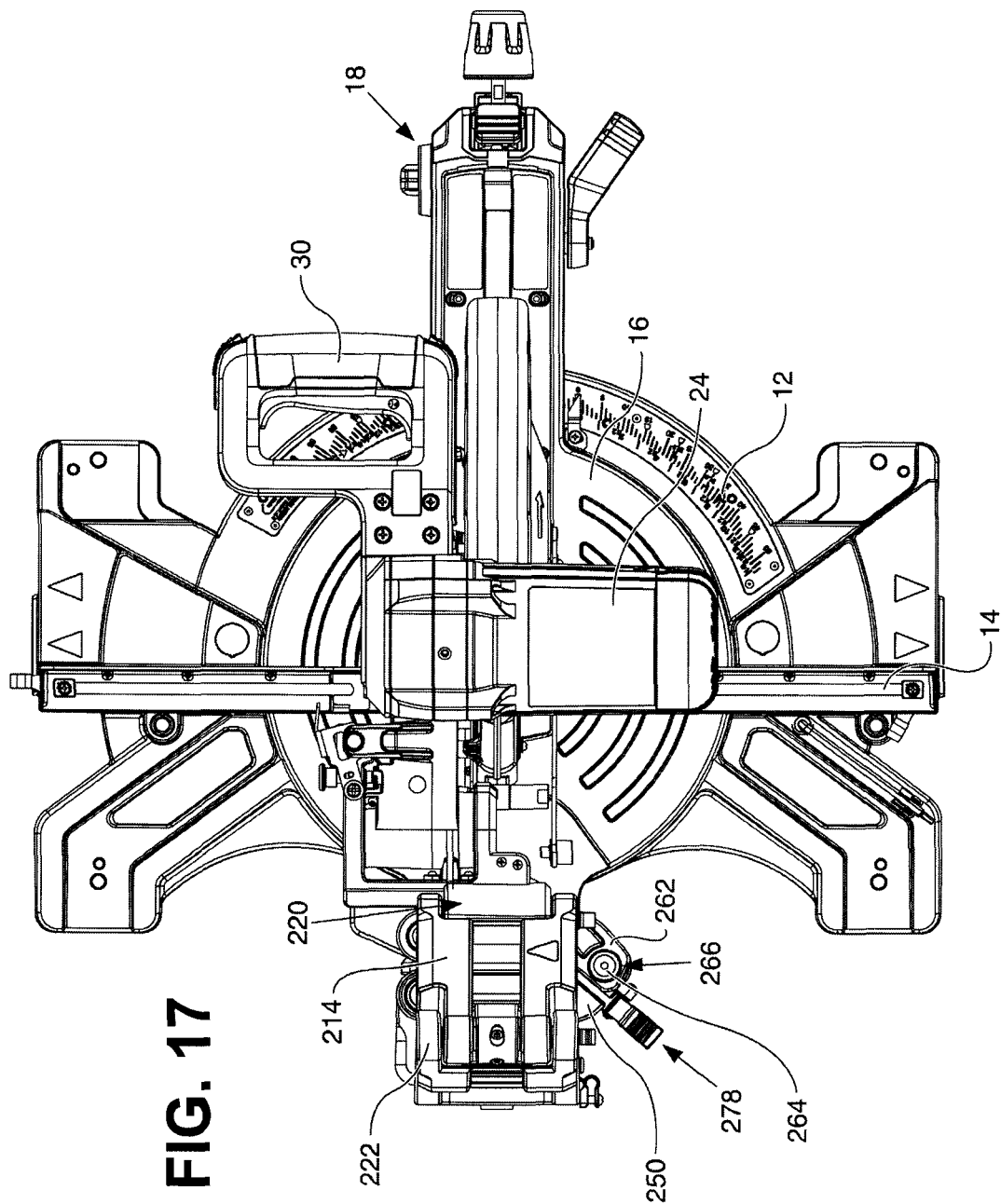
FIG. 17 is a top plan view of the miter saw shown in FIG. 13, with the blade and motor assembly in the retracted and lowered position and the blade being perpendicular to the fence.
Figure 18:
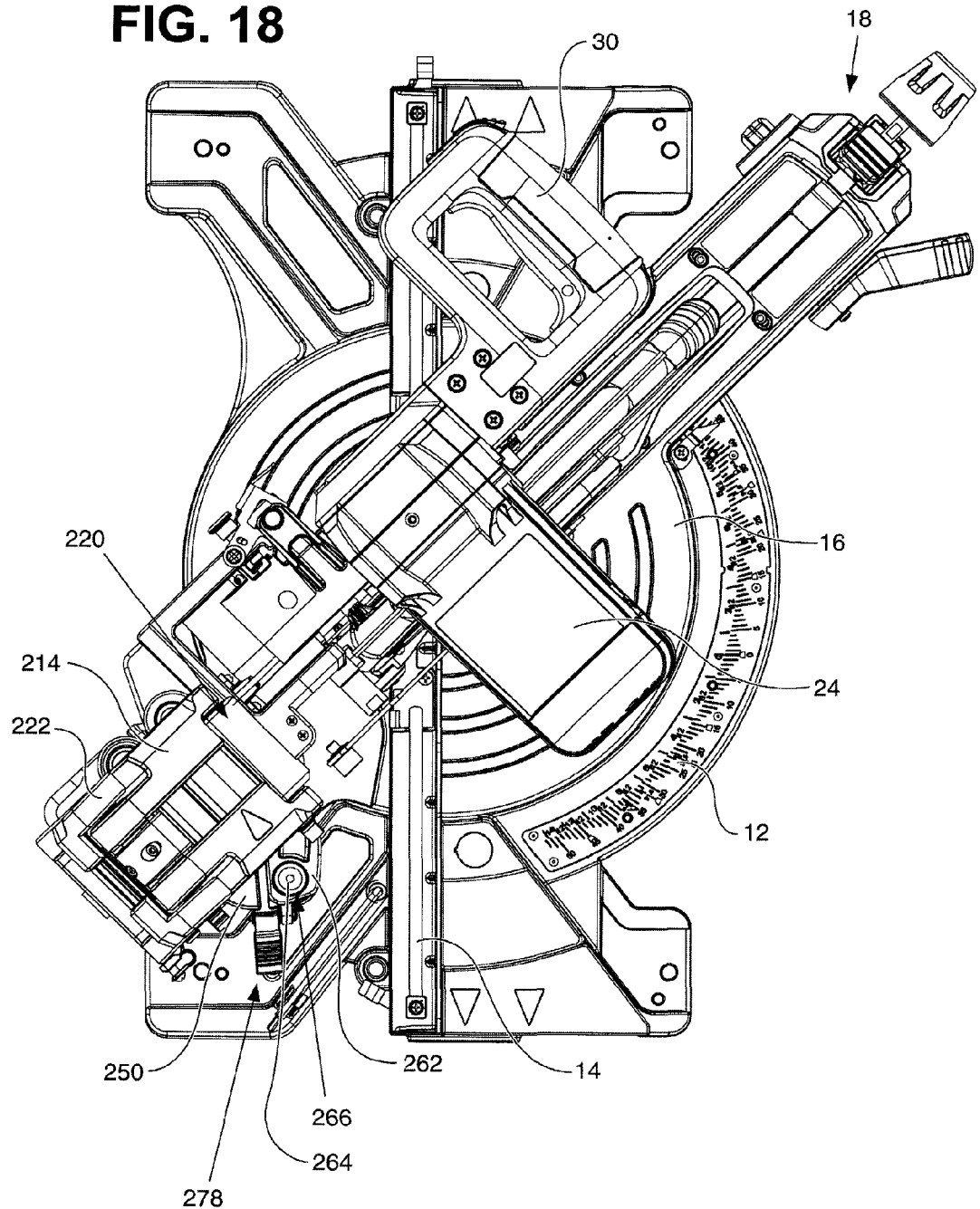
FIG. 18 is a top plan view of the miter saw shown if FIG. 13, with the blade and motor assembly in the retracted and lowered position and the blade being at a miter angle to the fence.

Another desirable attribute of this described embodiment is particularly illustrated in FIGS. 14, 16 and 17 wherein the blade and motor assembly 20 is in its retracted position and the second horizontal link 214 is substantially vertical. Since the link 214 does not extend rearwardly beyond the vertical support 232, it can be appreciated that the saw 200 can be placed very close to a rear wall or the like without impairing the normal operation of the saw.

Turning now to FIGS. 20-27, various embodiments of different hinge connections will be discussed. As mentioned above, any of these embodiments of hinge connections may be used in any of the embodiments of the saws discussed above, or they may be used in other devices. Further, a single device may include multiple different embodiments of hinge connections, of different sizes or of the same size. For example, in a single device, each hinge connection could be of a different design, each hinge connection could be of the same design, or several hinge connections could be of the same design and others being of one or more different designs, such as having all of the hinge connections of the vertical hinge linkage be of one design while having all of the hinge connections of the horizontal hinge linkage be of another design. For instance, it is contemplated that smaller and/or less robust (and presumably less expensive) hinge connections could be used for the vertical hinge linkage than in the horizontal hinge linkage, due to the smaller amount of force that the vertical hinge connections are required to withstand, when compared to the horizontal hinge connections.

Figure 20:
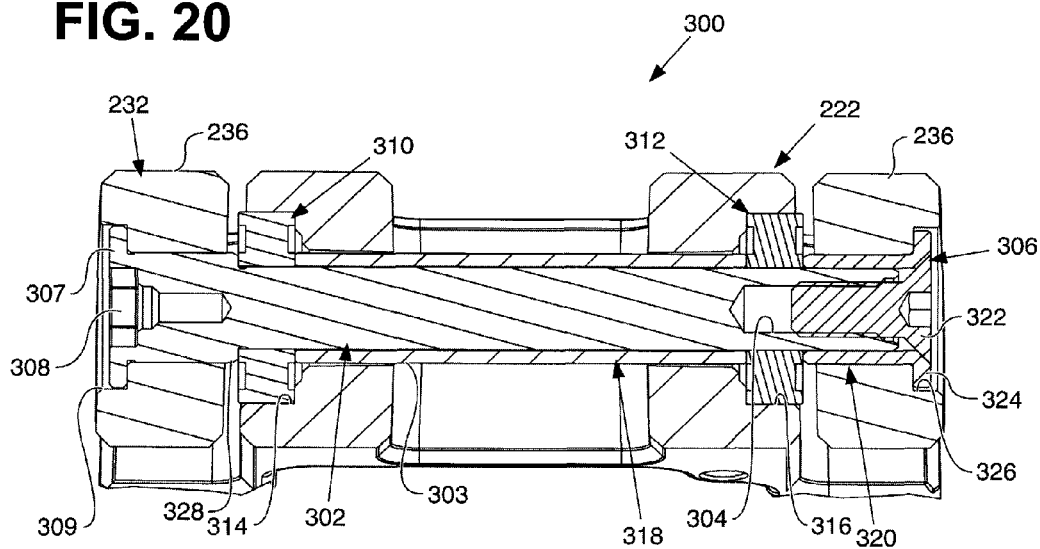
FIG. 20 is a cross-sectional view of a described embodiment of a hinge connection for a miter saw, in accordance with various embodiments of the invention.

FIG. 20 is a cross-sectional view of a first embodiment 300 of a hinge connection. In this figure, as well as in FIGS. 21-27, the hinge connection will be shown between vertical support 232 and second horizontal link 222 by way of example only. Of course, any embodiment of a hinge connection could be located between any two adjacent links (or between a link and a support) in any of the embodiments of the saws, as well as in other devices, as would be apparent to one of ordinary skill in the art.

In the FIG. 20 embodiment, the hinge connection 300 preferably employs parts manufactured to relatively precise tolerances such that only a relatively small axial gap is created between adjacent parts, which gap can be closed by tightening a screw (or with another mechanism for securing the parts together). More specifically, the hinge connection 300, which is shown as being formed between vertical support 232 and second horizontal link 222, includes a shaft 302 that extends essentially across the entire axial length thereof. One end of the shaft 302 includes a threaded aperture 304 for receiving a threaded fastening member such as screw 306, while the other end includes a hex socket 308 for receiving a hex wrench to apply a rotary force to (or to prevent rotation of) the shaft 302 during tightening of the screw 306. As known in the art, the hex socket 308 could be replaced with any known configuration for receiving a tool for preventing rotation or for applying a rotary force to the shaft. This end of the shaft 302 also preferably includes a terminal shoulder portion 307 (also referred to herein as first shoulder portion 307) that is configured to bear against the transverse surface of enlarged bore 309, and a second shoulder portion 328 that is configured to bear against bearing 310.

The shaft 302 is rotatably held within two sets of bearings 310 and 312, which are seated within recesses 314, 316, respectively, in second horizontal link 222. Bearings 310 and 312 may be of any desired type, such as ball bearings, needle bearings, roller bearings, journal bearings, etc. A spacer 318 preferably surrounds the shaft 302 in a location between the bearing 310 and the bearing 312. This optional spacer 302 provides additional rigidity to increase the stiffness and strength of the entire hinge connection 300. Finally, a bushing 320 is provided to surround the axial end of the shaft 302 in the area between the bearing 312 and head 322 of the screw 306. As can be seen in FIG. 20, the bushing 320 preferably includes a bushing flange 324 for receiving the axial force from the screw head 322 as the screw 306 is tightened. In this embodiment, the mating surfaces of both the screw head 322 and the bushing flange 324 are inclined to allow for better centering of the screw with respect to the bushing.

During assembly (or prior to adjustment if the hinge connection becomes loose), a small axial gap may exist between the end of the bushing 320 and the radially inner edge of the bearing 312 or between the bushing flange 324 and the transverse wall of enlarged bore 326. By tightening the screw 306 while preventing relative rotation of the shaft 302 by inserting a hex wrench into hex socket 308, the axial gap can be eliminated. If this gap is not eliminated, there is a chance that improper tracking of the hinge connection will result. Additionally, upon tightening of the screw 326, the spacer 318 (if provided) will be fixed for rotation with the shaft 302.

Optionally, the bearings 310 and 312 may be of the type that includes separate inner and outer races that allow for relative axial movement between the inner race and the outer race, such as disclosed in FIG. 19 of related U.S. application Ser. No. 11/714,981 (which application is hereby incorporated by reference in its entirety), whereby tightening of the screw 306 pulls both sets of inner races towards one another, thereby offsetting them from their associated outer races. Such a configuration can be used to further eliminate axial play within the hinge connection.

Figure 21:
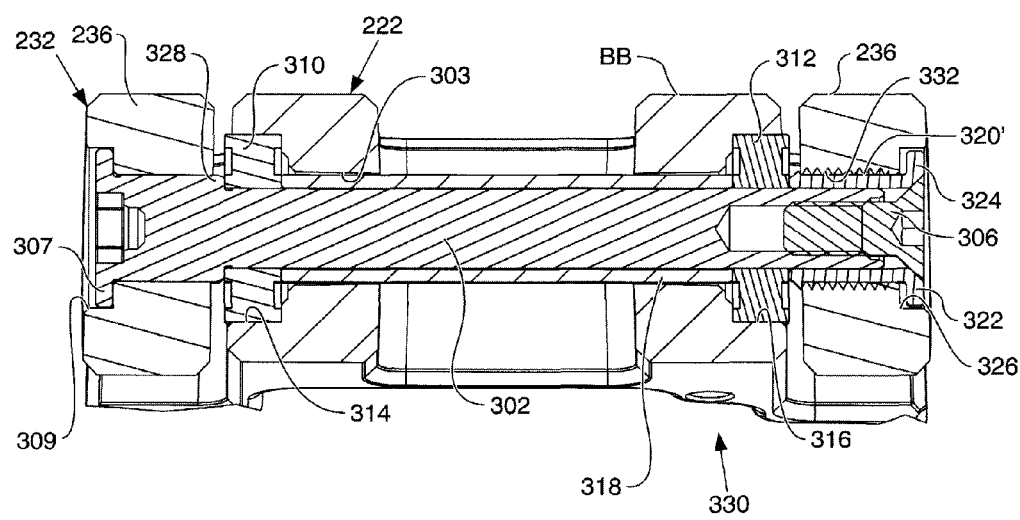
FIG. 21 is a cross-sectional view of another described embodiment of a hinge connection, in accordance with various embodiments of the invention.

Turning now to FIG. 21, a second embodiment of a hinge connection is shown, which embodiment will be referred to as hinge connection 330. The components of hinge connection 330 (the second embodiment) that are the same, or very similar, to those of hinge connection 300 (the first embodiment) will be referred to with the same reference numbers utilized previously, and as further discussion of these components is not necessary, it will not be provided. The primary difference between hinge connection 330 (of FIG. 21) and hinge connection 300 (of FIG. 20) is that hinge connection 330 includes a threaded bushing 320', whereas bushing 320 of FIG. 20 is not threaded. Additionally, the bore 332 of vertical support 232 is internally threaded for receiving threaded bushing 320'. Tightening the threaded bushing 320' within the threaded bore 332 eliminates the gap between threaded bushing 320' and the adjacent bearing 312 prior to the tightening of the screw 306. Thus, in this embodiment, the screw 320 is used primarily to restrain the shaft 302 in the axial direction (i.e., to prevent it from sliding out of the hinge connection). One of the benefits of the FIG. 21 embodiment over the FIG. 20 embodiment is that although the FIG. 21 embodiment still requires relatively precise tolerances for the parts, the tolerances for the axial lengths of shaft 302, the spacer 318, and the threaded bearing 320', as well as the distances between the bearing pockets of horizontal link 222 and the vertical support 232, are not as critical as in the FIG. 20 embodiment.

Figure 22:
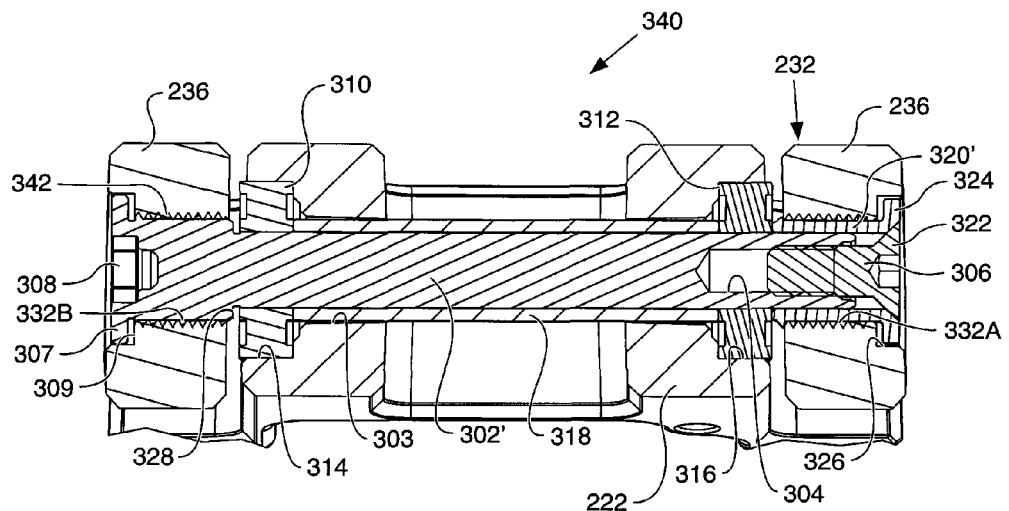
FIG. 22 is a cross-sectional view of another described embodiment of a hinge connection, in accordance with various embodiments of the invention.

Turning now to FIG. 22, a third embodiment of a hinge connection is shown, which embodiment will be referred to as hinge connection 340. The components of hinge connection 340 (the third embodiment) that are the same, or very similar, to those of hinge connection 330 (the first embodiment) or those of hinge connection 330 (the second embodiment) will be referred to with the same reference numbers utilized previously, and as further discussion of these components is not necessary, it will not be provided.

The primary difference between hinge connection 340 (of FIG. 22) and hinge connection 330 (of FIG. 21) is that in hinge connection 340, the shaft 302' includes a threaded end 342, whereas shaft 302 of FIG. 20 and FIG. 21 is not threaded. Additionally, the relevant portion of the bore of vertical support 232 (designated as bore 332A) is internally threaded for receiving the threaded end 342 of shaft 302'. Thus, in the FIG. 22 embodiment, both the bore 332A (in one side of the vertical support 232) and the bore 332B (in the other side of the vertical support 232) are internally threaded. By including threading on both the shaft 302' and the bushing 320', the axial gap(s) between the bearings (310 and 312) and the adjacent parts can eliminated by tightening the threaded parts. However, it should be noted that even after tightening, axial gaps will remain between shaft shoulder 307 and enlarged bore 309 and between bushing flange 324 and enlarged bore 326. In this embodiment, the screw 306 is utilized primarily to ensure that there is sufficient axial clamping force to hold the components together tightly, thereby ensuring the correct tracking of the hinge connection.

One of the benefits of the FIG. 22 embodiment over the FIG. 21 embodiment is that in the FIG. 22 embodiment, the need for relatively precise tolerances for the parts is not as critical as in the FIG. 20 and FIG. 21 embodiments.

Figure 23:
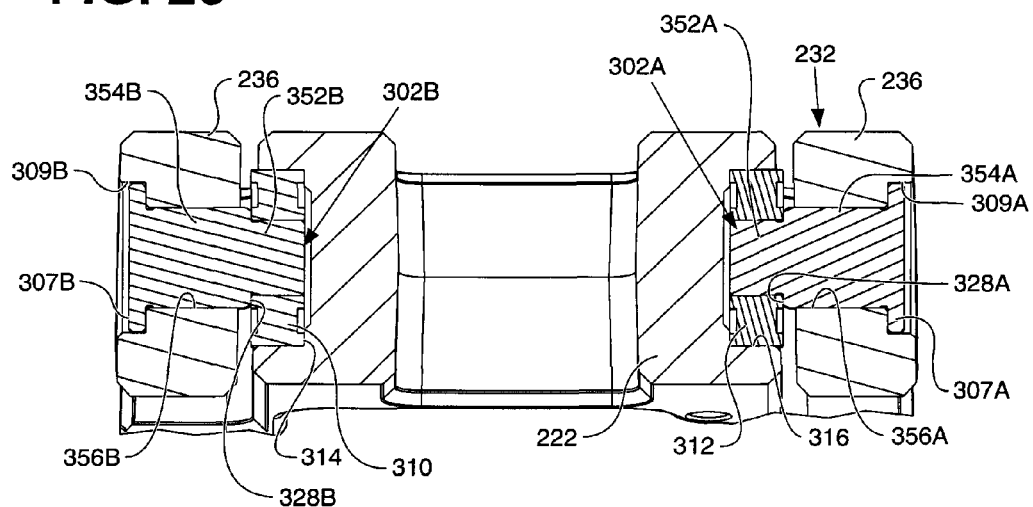
FIG. 23 is a cross-sectional view of another described embodiment of a hinge connection, in accordance with various embodiments of the invention.

Turning now to FIG. 23, a fourth embodiment of a hinge connection is shown, which embodiment will be referred to as hinge connection 350. As with all of the other embodiments, the components of hinge connection 350 (the fourth embodiment) that are the same, or very similar, to those of hinge connections 300, 330 and 340 will be referred to with the same reference numbers utilized previously, and as further discussion of these components is not necessary, it will not be provided.

One of the key features of hinge connection 350 of FIG. 23 is that this embodiment includes a split shaft, designated as first cantilever shaft 302A and second cantilever shaft 302B. In this embodiment, the relevant portion of second horizontal link 222 does not include a full length bore (such as bore 303 of FIGS. 20-22), but instead only includes recesses 314 and 316. In this embodiment, bearing 310 is press-fit into the recess 314 and bearing 312 is press-fit into the recess 316.

A reduced diameter portion 352A of first shaft 302A is press fit into bearing 312 and a reduced diameter portion 352B of second shaft 302B is press fit into bearing 310. The main axial portion 354A of the shaft 302A (which is of a larger diameter than that of reduced diameter portion 352A) is press fit into bore 356A of vertical support 232. Similarly, the main axial portion 354B of the shaft 302B (which is of a larger diameter than that of reduced diameter portion 352B) is press fit into bore 356B of vertical support 232. In this embodiment, as well as in all the other embodiments, the central axis of the bore(s) of the link 222 are aligned with the central axis of the bores of vertical support 232 (such as bores 356A/356B). The shoulder 328A on first shaft 302A and the shoulder 328B on second shaft 302B each provide a stop for ensuring that the shafts are properly seated within the bearings 312 and 310, respectively. Additionally, the terminal shoulder 307A on first shaft 302A and the terminal shoulder 307B on second shaft 302B each provide a stop for ensuring that the shafts are properly seated within the enlarged bores 309A and 309B, respectively, of the relevant portions of the vertical support 232. One of the benefits of this embodiment, when compared with the first three embodiments, is that the number of parts is reduced, and therefore this embodiment can be manufactured in a more cost effective manner than some of the other embodiments.

Figure 24:
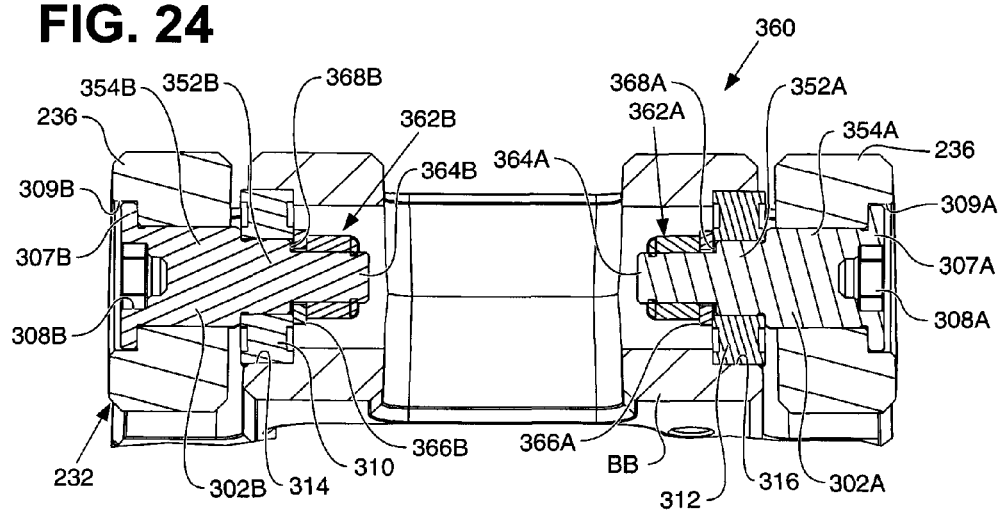
FIG. 24 is a cross-sectional view of another described embodiment of a hinge connection, in accordance with various embodiments of the invention.

Turning now to FIG. 24, a fifth embodiment of a hinge connection is shown, which embodiment will be referred to as hinge connection 360. As with all of the other hinge connection embodiments, the components of this hinge connection that are the same, or very similar, to those of the earlier embodiments will be referred to with the same reference numbers utilized previously, and as further discussion of these components is not necessary, it will not be provided.

The FIG. 24 embodiment is a variation on the FIG. 23 embodiment, except in the FIG. 24 embodiment, the bearings 310 and 312 are secured to shafts 302B and 302A, respectively, with the aid of a pair of clamping nuts (362B and 362A), either without the press fit, or with a less robust press fit than the FIG. 23 embodiment. More specifically, in the FIG. 24 embodiment, the clamping nut 362A is attached to shaft end portion 364A, which is threaded on the outer peripheral surface thereof, and the clamping nut 362B is secured to shaft end portion 364B, which is also threaded on the outer peripheral surface thereof. Preferably, the shaft end portions 364A and 364B are of an even smaller diameter than reduced diameter portions 352A and 352B. Additionally, a washer 366A is preferably inserted between clamping nut 362A and bearing 312. Similarly, a washer 366B is preferably inserted between clamping nut 362B and bearing 310. Such washers 366A and 366B can be seated against shoulders 368A and 368B, respectively.

The exterior end of the shaft 302A includes a hex socket 308A for receiving a hex wrench to apply a rotary force to (or to prevent rotation of) the shaft 302A during tightening of the clamping nut 362A. Similarly, the exterior end of the shaft 302B includes a hex socket 308B for receiving a hex wrench to apply a rotary force or to prevent rotation of the shaft 302B during tightening of the clamping nut 362B. As known in the art, the hex sockets 308A and 308B could be replaced with any known configuration for receiving a tool for preventing rotation or for applying a rotary force to the shaft. Alternatively, shafts 302A and 302B could be shaped or otherwise configured such that relative rotation between the shaft and vertical support 232 is prevented (such as with a key and key slot configuration).

One of the benefits of the FIG. 24 embodiment over the FIG. 23 embodiment is that in the FIG. 23 embodiment, the press fit can exert significant radial and axial forces upon the bearings 310, 312, but in the FIG. 24 embodiment, interference between the shafts 302A, 302B and the inner races of bearings 310, 312 can be reduced by the use of the clamping nuts 362A, 362B.

Figure 25:
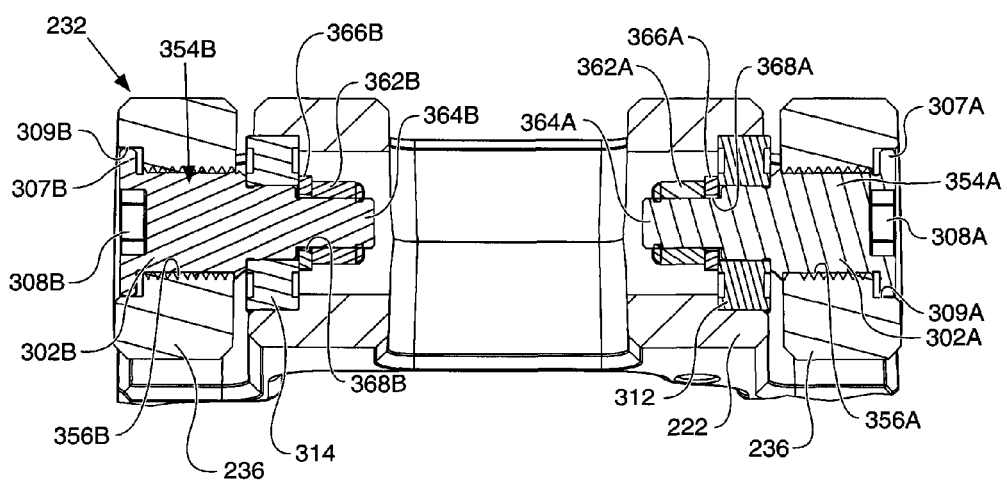
FIG. 25 is a cross-sectional view of another described embodiment of a hinge connection, in accordance with various embodiments of the invention.

Turning now to FIG. 25, a sixth embodiment of a hinge connection is shown, which embodiment will be referred to as hinge connection 370. As with all of the other hinge connection embodiments, the components of this hinge connection that are the same, or very similar, to those of the earlier embodiments will be referred to with the same reference numbers utilized previously, and as further discussion of these components is not necessary, it will not be provided.

The FIG. 25 embodiment is a variation on the FIG. 24 embodiment, except in the FIG. 25 embodiment, the shafts 302A and 302B are externally threaded along their main axial portions (354A and 354B), and bores 356A and 356B of vertical support 232 are internally threaded for receiving the shafts. In this embodiment, even after tightening, axial gaps will remain between the shaft shoulder portions 307A/307B and the base of the adjacent enlarged bore 309A/309B.

One of the benefits of the FIG. 25 embodiment are that the press fits between shafts 302A/302B and the outer flanges 236 of vertical support 232 are eliminated by the threaded connection. In addition, such a configuration does not require as precise tolerances as necessary in the FIG. 23 and FIG. 24 embodiments.

Figure 26:
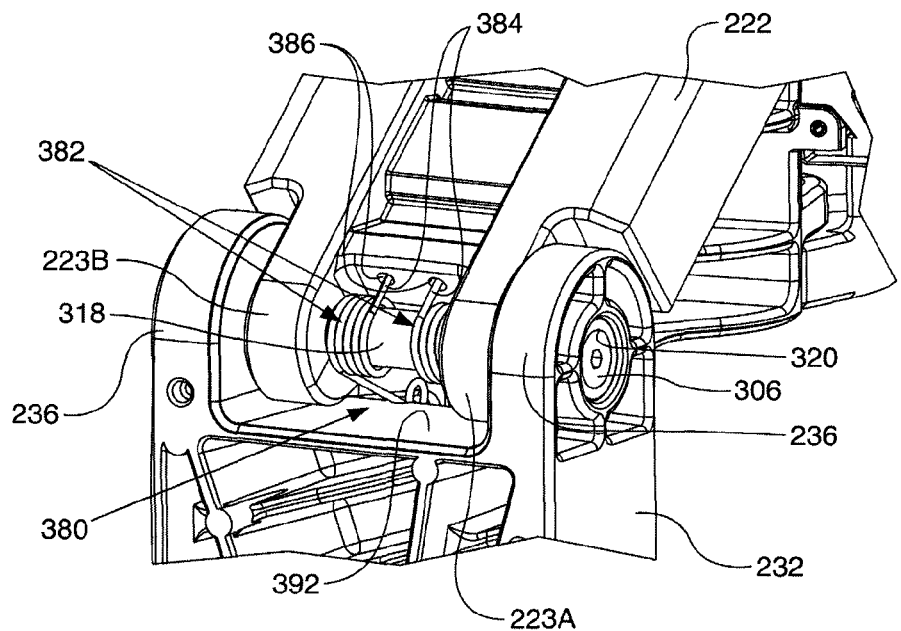
FIG. 26 is a perspective view of a described embodiment of a hinge connection that includes a biasing return mechanism, in accordance with various embodiments of the invention.
Figure 27:
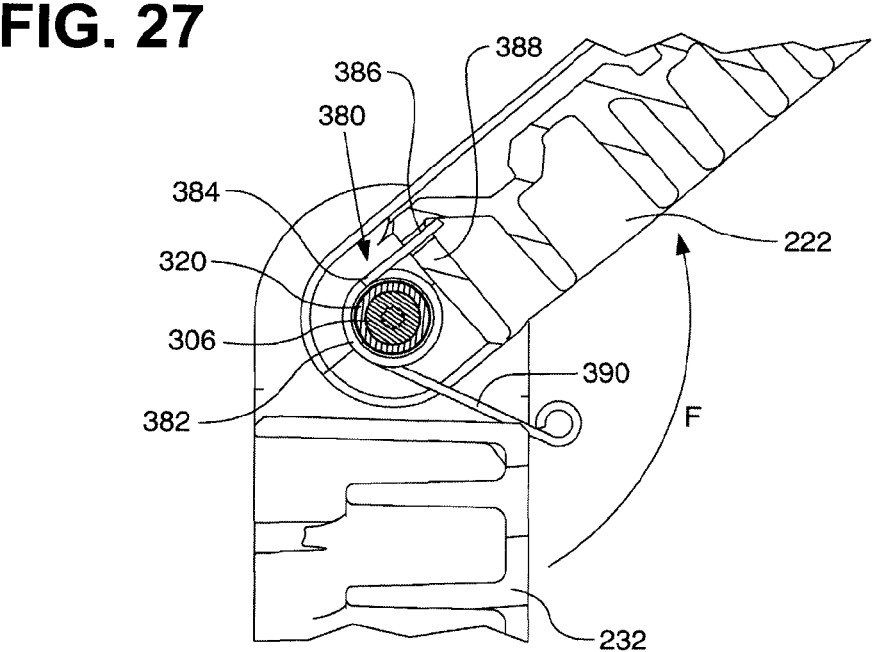
FIG. 27 is a cross-sectional view of the hinge connection of FIG. 26.

Turning now to FIGS. 26 and 27, a description will be provided for a biasing return mechanism 380, which is a mechanism that is used to return the hinge connection to a collapsed state (such as the state shown in FIGS. 2, 6, 7, 11, 14, 16, 17 and 18). The biasing return mechanism 380 preferably includes a biasing element such as a pair of torsion springs 382. Of course, more than two biasing elements could be used, or even a single biasing element. In the embodiment shows, the coil portions of the torsion springs 382 are wrapped around the spacer 318, if such a spacer is present, otherwise they can be wrapped directly around shaft 302 (FIG. 20). The first elongated portion 384 of each of the springs 382 is preferably inserted into an aperture 386 in a wall portion 388 of the second horizontal link 222. The second elongated portion 390 of each of the springs 382 contacts surface 392 of vertical support 232. Accordingly, a biasing force is created that moves second horizontal link 222 in the direction of arrow F, which collapses the linkage to the state shown in FIGS. 2, 6, 7, 11, 14, 16, 17 and 18.

It is contemplated that the contact surfaces for elongated portions 384 and 390 of torsion spring 382 could be configured differently than the configuration shown in FIGS. 26 and 27, as long as the torsion spring is allowed to provide the necessary rotary bias between vertical support 232 and second horizontal link 222. For example, instead of using two apertures 386, with one aperture receiving each of the elongated portions (384, 390) of the torsion spring 382, a single slot-like aperture could receive both elongated portions. Further, the slot/aperture could be located in vertical support 232 instead of in second horizontal link 222. In addition, it is also contemplated that one or more different types of biasing elements could be used in place of torsion springs 382.

FIGS. 26 and 27 show the biasing return mechanism 380 in conjunction with hinge connection 300 of FIG. 20, and in a location between vertical support 232 and second horizontal link 222. Of course, a biasing return mechanism could easily be used with the hinge connections shown FIGS. 21 and 22 as well because both of these embodiments also include a single shaft 302 (as does the FIG. 20 embodiment). Additionally, it is also contemplated that the biasing return mechanism 380 could be used with other embodiments of the hinge connection. For example, in the embodiment of FIGS. 23-25, which each include cantilever shafts 302A/302B in place of a single shaft, the biasing return mechanism 380 could be used with some modifications to the connection area, such as by providing a stationary shaft between the interior flanges 223A and 223B of second horizontal link 222 for the FIG. 23 embodiment or, for the embodiments of FIGS. 24 and 25, by extending the axial lengths of cantilever shafts 302A/302B towards each other to provide surfaces for a torsion spring to wrap around. Further, although the biasing return mechanism is shown and described as being on the hinge connection between vertical support 232 and second horizontal link 222, it is contemplated that it could also be used in hinge connections in other locations.

While various embodiments of the invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A power saw comprising:
   a table configured to receive a workpiece;
   a saw blade and motor assembly operatively connected to said table, said saw blade and motor assembly being configured to rotate a saw blade;
   a linear guide mechanism attached to said table and being configured to support said saw blade and motor assembly and enable movement of said saw blade and motor assembly along a predetermined linear path in either a forward or a rearward direction;
   said linear guide mechanism comprising at least two links connected by a hinge connection, wherein said hinge connection comprises:
      a shaft that is fixed for rotation with respect to a first one of said links, but wherein said shaft is able to rotate with respect to a second one of said links;
      a threaded aperture formed within a first end portion of said shaft;
      a pair of bearings associated with said second link, wherein said shaft is seated within said bearings;
      a spacer surrounding said shaft, wherein said spacer is positioned between said bearings;
      a bushing surrounding said first end portion of said shaft, wherein said bushing is positioned such that a first one of said bearings is located between said spacer and said bushing;
      a threaded fastening member configured and arranged to be inserted into said threaded aperture of said shaft; and
      a bushing flange extending radially outwardly from a first end portion of said bushing, wherein at least a portion of said bushing flange is configured and arranged to receive an axial force applied by said threaded fastening member as said threaded fastening member is tightened.

2. The power saw according to claim 1, wherein said bushing flange is configured and arranged to be seated within an enlarged bore formed in a first end portion of said first link.

3. The power saw according to claim 1, whereby upon insertion and tightening of said threaded fastening member such that said threaded fastening member applies the axial force upon said bushing, any axial gap between said first bearing and said bushing is eliminated.

4. The power saw according to claim 1, wherein:
   said shaft includes a second end portion that is axially opposite of said first end portion; and
   said second end portion of said shaft includes a first shoulder portion and a second shoulder portion, whereby said second shoulder portion is located between said first shoulder portion and a second one of said bearings.

5. The power saw according to claim 4, wherein:
   said bushing flange is configured and arranged to be seated within a first enlarged bore formed in a first end portion of said first link; and
   said first shoulder portion is configured and arranged to be seated within a second enlarged bore formed in a second end portion of said first link.

6. The power saw according to claim 1, wherein said threaded fastening member comprises a screw that includes a screw head.

7. The power saw according to claim 6, wherein mating surfaces of said screw head and said bushing flange are inclined to facilitate centering of said screw with respect to said bushing.

8. The power saw according to claim 1, wherein:
   said bushing is threaded on an outer peripheral surface thereof; and
   a first bore of said first link is internally threaded for receiving said threaded bushing.

9. The power saw according to claim 8, wherein:
   a second end portion of said shaft is externally threaded; and
   a second bore of said first link is internally threaded for receiving said threaded second end portion of said shaft.

10. The power saw according to claim 9, wherein said second end portion of said shaft includes a first shoulder portion and a second shoulder portion, whereby said second shoulder portion is located between said first shoulder portion and a second one of said bearings.

11. The power saw according to claim 1, wherein:
    said linear guide mechanism has a first pivot axis perpendicular to the plane of said saw blade about which said saw blade and motor assembly is pivotable to move said saw blade vertically into and out of cutting position; and
    said hinge connection defines a second pivot axis, along said shaft, that is parallel to said first pivot axis.

12. The power saw according to claim 1, further comprising a biasing return mechanism, wherein said biasing return mechanism comprises:
    at least one torsion spring that includes a first elongated portion, a second elongated portion and a coil portion located between said first and second elongated portions; and
    an aperture formed in a wall portion of said second link,
    wherein said coil portion is wrapped around said shaft, said first elongated portion is seated within said aperture within said wall, and said second elongated portion contacts a portion of said first link.

13. A hinge connection between a first link and a second link, said hinge connection comprising:
    a shaft that is fixed for rotation with respect to said first link, but wherein said shaft is able to rotate with respect to said second link;
    a threaded aperture formed within a first end portion of said shaft;
    a pair of bearings associated with said second link, wherein said shaft is seated within said bearings;
    a spacer surrounding said shaft, wherein said spacer is positioned between said bearings;
    a bushing surrounding said first end portion of said shaft, wherein said bushing is positioned such that a first one of said bearings is located between said spacer and said bushing;
    a threaded fastening member configured and arranged to be inserted into said threaded aperture of said shaft; and
    a bushing flange extending radially outwardly from a first end portion of said bushing, wherein at least a portion of said bushing flange is configured and arranged to receive an axial force applied by said threaded fastening member as said threaded fastening member is tightened;
    wherein said bushing flange is configured and arranged to be seated within an enlarged bore formed in a first end portion of said first link, whereby upon insertion and tightening of said threaded fastening member such that said threaded fastening member applies the axial force upon said bushing, any axial gap between said first bearing and said bushing is eliminated; wherein, said shaft includes a second end portion that is axially opposite of said first end portion;

said second end portion of said shaft includes a first shoulder portion and a second shoulder portion, whereby said second shoulder portion is located between said first shoulder portion and a second one of said bearings;

said bushing flange is configured and arranged to be seated within a first enlarged bore formed in a first end portion of said first link; and said first shoulder portion is configured and arranged to be seated within a second enlarged bore formed in a second end portion of said first link.

14. The hinge connection according to claim 13, wherein:

said threaded fastening member comprises a screw that includes a screw head; and mating surfaces of said screw head and said bushing flange are inclined to facilitate centering of said screw with respect to said bushing.

15. The hinge connection according to claim 13, wherein:

said bushing is threaded on an outer peripheral surface thereof; and a first bore of said first link is internally threaded for receiving said threaded bushing.

16. The hinge connection according to claim 15, wherein:

a second end portion of said shaft is externally threaded; and a second bore of said first link is internally threaded for receiving said threaded second end portion of said shaft.

17. The hinge connection according to claim 16, wherein said second end portion of said shaft includes a first shoulder portion and a second shoulder portion, whereby said second shoulder portion is located between said first shoulder portion and a second one of said bearings.

* * * * *